United States Patent
Endo et al.

(10) Patent No.: US 10,120,484 B2
(45) Date of Patent: Nov. 6, 2018

(54) DRIVE CONTROL APPARATUS, ELECTRONIC DEVICE AND DRIVE CONTROLLING METHOD

(71) Applicant: FUJITSU LIMITED, Kawasaki-shi, Kanagawa (JP)

(72) Inventors: Yasuhiro Endo, Ebina (JP); Yuichi Kamata, Isehara (JP); Kiyoshi Taninaka, Ebina (JP); Akinori Miyamoto, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 289 days.

(21) Appl. No.: 15/079,496

(22) Filed: Mar. 24, 2016

(65) Prior Publication Data

US 2016/0209979 A1 Jul. 21, 2016

Related U.S. Application Data

(63) Continuation of application No. PCT/JP2014/064394, filed on May 30, 2014, and a (Continued)

(30) Foreign Application Priority Data

Sep. 26, 2013 (WO) .................. PCT/JP2013/076077

(51) Int. Cl.
*G06F 3/041* (2006.01)
*G06F 3/0488* (2013.01)
(Continued)

(52) U.S. Cl.
CPC ............ *G06F 3/0416* (2013.01); *G06F 3/016* (2013.01); *G06F 3/0412* (2013.01);
(Continued)

(58) Field of Classification Search
CPC ... G06F 3/017; G06F 3/0484; G06F 31/11616
(Continued)

(56) References Cited

U.S. PATENT DOCUMENTS

| 9,400,571 B2 | 7/2016 | Kamata et al. |
| 2003/0174121 A1 | 9/2003 | Poupyrev et al. |

(Continued)

FOREIGN PATENT DOCUMENTS

| CN | 102246127 | 11/2011 |
| JP | 2003-337649 A | 11/2003 |

(Continued)

OTHER PUBLICATIONS

JPOA—Office Action dated Oct. 4, 2016 issued with respect to the corresponding Japanese Patent Application No. 2015-538940, with partial English translation.
(Continued)

*Primary Examiner* — Calvin C Ma
(74) *Attorney, Agent, or Firm* — Fujitsu Patent Center

(57) ABSTRACT

A drive control apparatus that drives a vibrating element of an electronic device including a touch panel and the vibrating element generating a vibration in a manipulation input surface of the touch panel, including, a drive controller being configured to drive the vibrating element by using a drive signal causing the vibrating element to generate a natural vibration in an ultrasound-frequency-band in the manipulation input surface, the drive controller being configured to drive the vibrating element so as to switch the natural vibration between a strong level and a weak level in accordance with a travel distance of a position of a manipulation input performed onto the manipulation input surface.

20 Claims, 26 Drawing Sheets

Related U.S. Application Data continuation of application No. PCT/JP2013/076077, filed on Sep. 26, 2013.

(51) Int. Cl.
*G06F 3/01* (2006.01)
*G06F 3/0484* (2013.01)

(52) U.S. Cl.
CPC .......... *G06F 3/0484* (2013.01); *G06F 3/0488* (2013.01); *G06F 2203/014* (2013.01); *G06F 2203/04103* (2013.01)

(58) Field of Classification Search
USPC ................................ 345/156, 157, 173, 174
See application file for complete search history.

(56) References Cited

U.S. PATENT DOCUMENTS

| | | | |
|---|---|---|---|
| 2006/0007182 A1 | 1/2006 | Sato et al. | |
| 2006/0152497 A1 | 7/2006 | Rekimoto | |
| 2009/0140999 A1 | 6/2009 | Sato et al. | |
| 2010/0141410 A1* | 6/2010 | Aono | G06F 3/016 340/407.2 |
| 2010/0253486 A1 | 10/2010 | Sato et al. | |
| 2011/0291976 A1* | 12/2011 | Takada | G06F 3/016 345/173 |
| 2012/0154328 A1 | 6/2012 | Kono | |
| 2014/0053111 A1* | 2/2014 | Beckman | G06F 3/04812 715/856 |
| 2014/0118127 A1 | 5/2014 | Levesque et al. | |
| 2014/0139450 A1* | 5/2014 | Levesque | G08B 6/00 345/173 |

FOREIGN PATENT DOCUMENTS

| | | |
|---|---|---|
| JP | 2006-024039 A | 1/2006 |
| JP | 2006-351042 A | 12/2006 |
| JP | 2010-140102 A | 6/2010 |
| JP | 2010-231609 A | 10/2010 |
| JP | 2010-238222 A | 10/2010 |
| JP | 2011-048832 A | 3/2011 |
| JP | 2012-243189 A | 12/2012 |

OTHER PUBLICATIONS

Takeyuki Dohda et al., "The Printed-matter Typecasting Method for Haptic Feel Design and Sticky-band Illusion", The collection of papers of the 11th SICE system integration division annual conference (SI2010), Dec. 23-25, 2010, Sendai, Japan) pp. 174 to 177 (4 pages) English Abstract.

Masashi Nakatani et al., "The Fishbone Tactile Illusion", Collection of papers of the 10th Congress of the Virtual Reality Society of Japan, Sep. 2005 (5 pages).

International Search Report and Written Opinion of the International Searching Authority (Form PCT/ISA/210 and 237), dated Aug. 19, 2014 in connection with PCT/JP2014/064394 (10 pages).

CNOA—Office Action dated Feb. 5, 2018 issued with respect to the corresponding Chinese Patent Application No. 201480053294.2 with full English translation.

* cited by examiner

FIG.7

| APPLICATION ID | AREA DATA | VIBRATION PATTERN | DESIGNATED DISTANCE D |
|---|---|---|---|
| 1 | f1=(X,Y) | P1 | D1 |
| 1 | f2=(X,Y) | P2 | D2 |
| 1 | f3=(X,Y) | P3 | D3 |
| 1 | f4=(X,Y) | P4 | D4 |
| | | | |

FIG.18
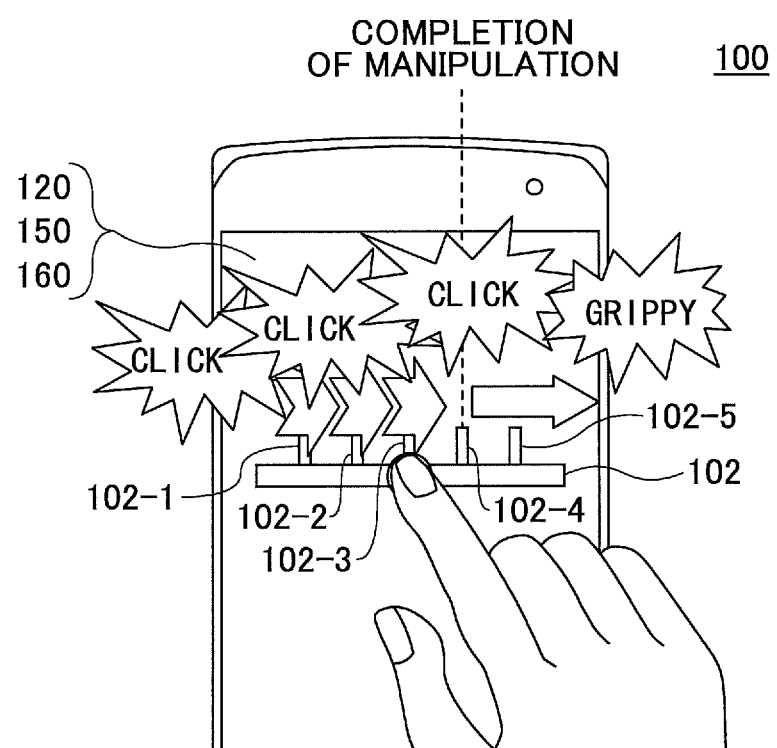
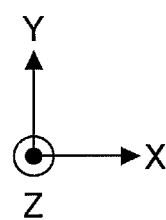

DRIVE CURRENT

DRIVE CONTROL APPARATUS, ELECTRONIC DEVICE AND DRIVE CONTROLLING METHOD

CROSS-REFERENCE TO RELATED APPLICATION

This application is a continuation application of International Application PCT/JP2014/064394 filed on May 30, 2014, which claims the benefit of priority of International Application PCT/JP2013/076077 filed on Sep. 26, 2013, and designates the U.S., the entire contents of which are incorporated herein by reference.

FIELD

The embodiment discussed herein is related to a drive control apparatus, an electronic device and a drive controlling method.

BACKGROUND

There has been a tactile sensation producing apparatus which includes a display, a contact detector that detects a contact state of user's manipulate operation to the display and a haptic vibration generating part which generates haptic vibration that gives a designated sensation to the user's body-part contacting the display (for example, see Patent Document 1).

The tactile sensation producing apparatus further includes a vibration waveform data generating means which generates a waveform data based on a detected result of the contact detector. The waveform data is used for generating the haptic vibration. The tactile sensation producing apparatus further includes an ultrasound modulating means which performs a modulating process on the waveform data by utilizing an ultrasound as a carrier wave and outputs an ultrasound signal generated by the modulating process to the haptic vibration generating means as a signal used for generating the haptic vibration.

The ultrasound modulating means performs either a frequency modulation or a phase modulation. The ultrasound modulating means further performs an amplitude modulation.

There has been an input device that includes a touch detect sensor which detects a touch position of a biological body or an object in a designated detection area, and a control means which performs an input process for accepting an input of a designated function in response to a touch position or a change of the touch position detected by the touch sensor and outputs a drive signal every time the touch position changes more than or equal to a designated amount (see patent document 2, for example). The input device further includes an actuator which vibrates at least a vicinity of an arrange position of the touch sensor for a temporary period of time in response to the drive signal output from the control means.

However, a ultrasound frequency used in the conventional tactile sensation producing apparatus may be any frequency as long as the frequency is higher than that of an audio frequency (about 20 kHz). No specific setting is made for the ultrasound frequency. Accordingly, the tactile sensation producing apparatus cannot provide a fine or crisp tactile sensation to the user.

Although the conventional input device includes the actuator which vibrates at least the vicinity of the arrange position of the touch sensor for the temporary period of time every time the touch position changes more than or equal to the designated amount, no creative solution is made for the vibration. Accordingly, the input device cannot provide a fine or crisp tactile sensation to the user.

Related-Art Documents

Patent Documents

[Patent Document 1] Japanese Laid-open Patent Publication No. 2010-231609
[Patent Document 2] Japanese Laid-open Patent Publication No. 2003-337649

SUMMARY

According to an aspect of the present application, there is provided a drive control apparatus that drives a vibrating element of an electronic device including a touch panel and the vibrating element generating a vibration in a manipulation input surface of the touch panel, including, a drive controller being configured to drive the vibrating element by using a drive signal causing the vibrating element to generate a natural vibration in an ultrasound-frequency-band in the manipulation input surface, the drive controller being configured to drive the vibrating element so as to switch the natural vibration between a strong level and a weak level in accordance with a travel distance of a position of a manipulation input performed onto the manipulation input surface.

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 7 is a diagram illustrating control data stored in a memory;

FIG. 18 is a diagram illustrating an example of an operating state of the drive control apparatus according to a second embodiment;

DESCRIPTION OF EMBODIMENT

Hereinafter, an embodiment to which a drive control apparatus, an electronic device and a drive controlling method of the present invention are applied will be described.

First Embodiment

Figure 1:
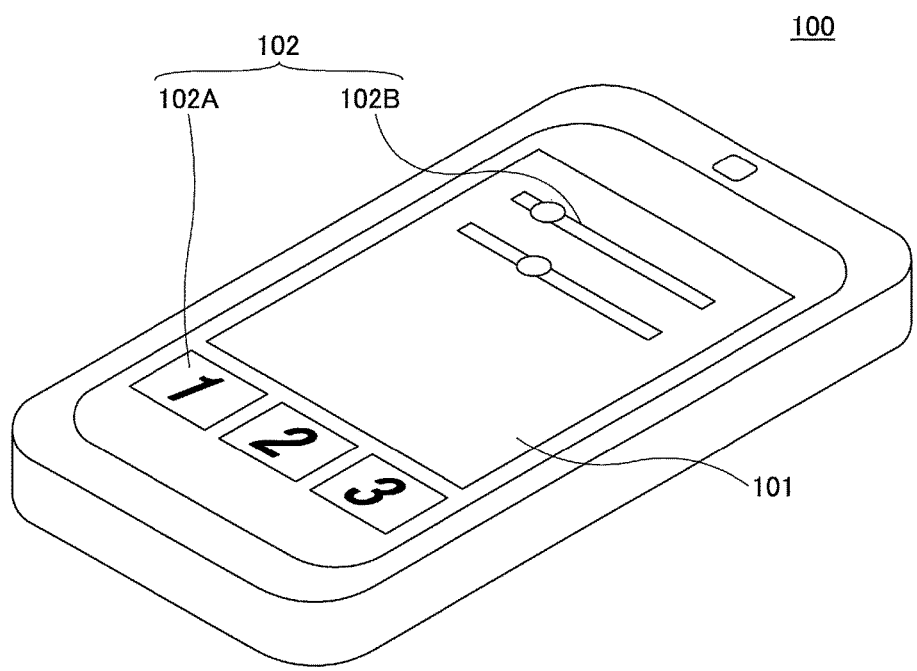
FIG. 1 is a diagram illustrating an electronic device according to a first embodiment in perspective view.

FIG. 1 is a diagram illustrating an electronic device 100 according to the embodiment in perspective view.

The electronic device 100 is a smart phone or a tablet computer that includes a touch panel as a manipulation input part, for example. The electronic device 100 may be any device as long as the device includes a touch panel as a manipulation input part. Accordingly, the electronic device 100 may be a device such as a handy type information terminal device, an Automatic Teller Machine (ATM) placed at a specific location or the like, for example.

In a manipulation input part 101 of the electronic device 100, a display panel is disposed under a touch panel, and a button 102A, a slider 102B or the like (hereinafter referred to as Graphic User Interface (GUI) input part(s) 102) are displayed on the display panel.

A user of the electronic device 100 touches the manipulation input part 101 in order to manipulate (operate) the GUI input part 102 with a fingertip under normal conditions.

Hereinafter, a detailed configuration of the electronic device 100 will be described with reference to FIG. 2.

Figure 2:
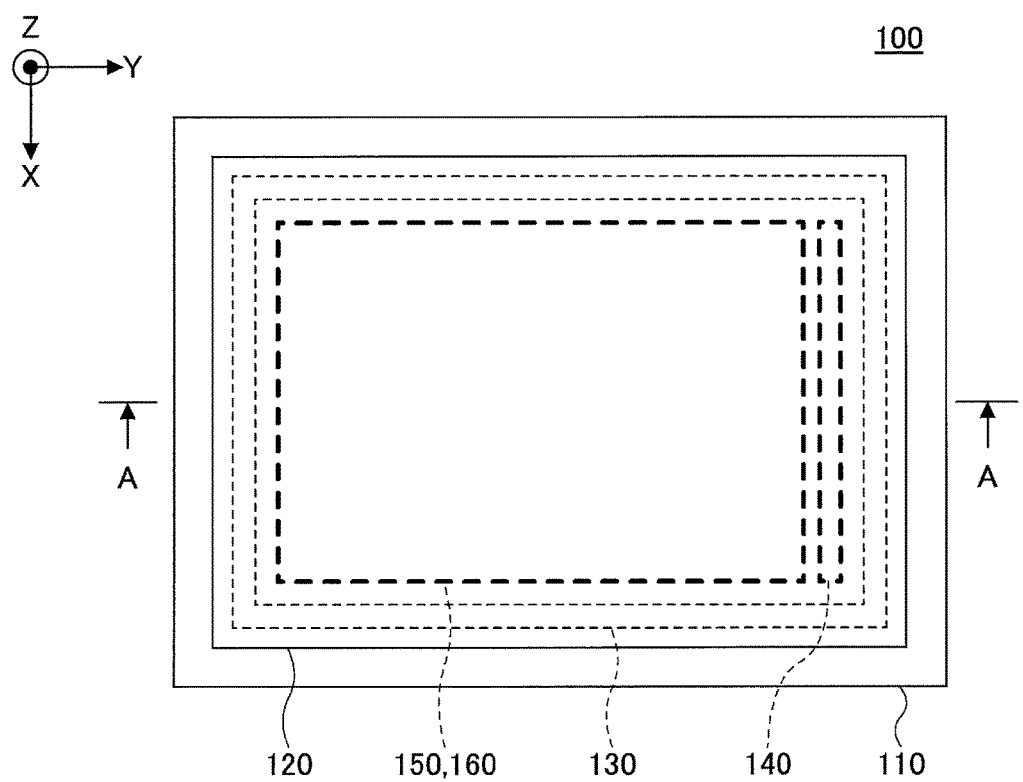
FIG. 2 is a diagram illustrating the electronic device of the first embodiment in plan view.
Figure 3:
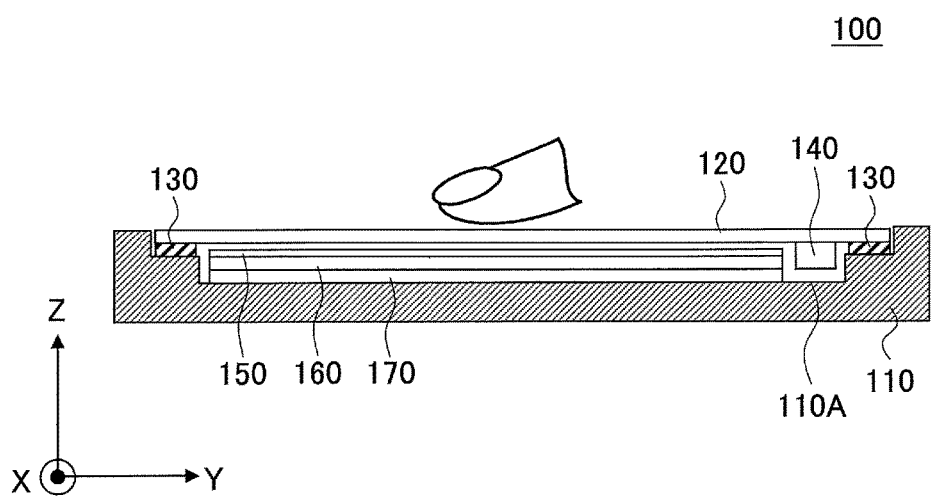
FIG. 3 is a diagram illustrating a cross-sectional view of the electronic device taken along a line A-A of FIG. 2.

FIG. 2 is a diagram illustrating the electronic device 100 of the embodiment in plan view. FIG. 3 is a diagram illustrating a cross-sectional view of the electronic device 100 taken along a line A-A of FIG. 2. An XYZ coordinate system as an orthogonal coordinate system is defined in FIGS. 2 and 3.

The electronic device 100 includes a housing 110, a top panel 120, a double-faced adhesive tape 130, a vibrating element 140, a touch panel 150, a display panel 160 and a substrate 170.

The housing 110 is made of a plastic, for example. As illustrated in FIG. 3, the substrate 170, the display panel 160 and the touch panel 150 are contained in a concave portion 110A of the housing 110, and a top panel 120 is adhered onto the housing 110 by the double-faced adhesive tape 130.

The top panel 120 is a plate-shaped member having a rectangular shape in plan view and is made of a transparent glass or a reinforced plastic such as polycarbonate. A surface of the top panel 120 which is located on a positive side in Z axis direction is one example of a manipulation input surface into which the user of the electronic device 100 performs a manipulation input.

The vibrating element 140 is bonded on a surface of the top panel 120 which is located on a negative side in Z axis direction, and the top panel 120 is adhered to the housing 110 by the double-faced adhesive tape 130. Herein, the double-faced adhesive tape 130 is not necessarily a rectangular-ring-shaped member in plan view as illustrated in FIG. 3, as long as the double-faced adhesive tape 130 can adhere four corners of the top panel 120 to the housing 110.

The touch panel 150 is disposed on the negative side in Z axis direction of the top panel 120. The top panel 120 is provided for the sake of protecting the surface of the touch panel 150. Another panel, protection film or the like may be provided onto the surface of the top panel 120.

In a state where the vibrating element 140 is bonded onto the surface of the top panel 120 located on the negative side in Z axis direction, the top panel 120 vibrates if the vibrating element 140 is being driven. In the embodiment, a standing wave is generated in the top panel 120 by causing the top panel 120 to vibrate at a natural vibration frequency (natural resonance frequency or eigenfrequency) of the top panel 120. Since the vibrating element 140 is bonded to the top panel 120, it is preferable to determine the natural vibration frequency in consideration of a weight of the vibrating element 140 or the like, in a practical manner.

The vibrating element 140 is bonded on the surface of the top panel 120 which is located on the negative side in Z axis direction at a location along the short side extending in X axis direction at a positive side in Y axis direction. The vibrating element 140 may be any element as long as it can generate vibration at an ultrasound-frequency-band. A piezoelectric element such as a piezo element is used as the vibrating element 140, for example.

The vibrating element 140 is driven in accordance with a drive signal output from the drive controller which will be described later. An amplitude (intensity) and a frequency of the vibration output from the vibrating element 140 is set (determined) by the drive signal. An on/off action of the vibrating element 140 is controlled in accordance with the drive signal.

The ultrasound-frequency-band is a frequency band which is higher than or equal to about 20 kHz, for example. According to the electronic device 100 of the embodiment, the frequency at which the vibrating element 140 vibrates is equal to a number of vibrations per unit time (frequency) of the top panel 120. Accordingly, the vibrating element 140 is driven in accordance with the drive signal so that the vibrating element 140 vibrates at a number of natural vibrations per unit time (natural vibration frequency) of the top panel 120.

The touch panel 150 is disposed on upper side (positive side in Z axis direction) of the display panel 160 and is disposed on lower side (negative side in Z axis direction) of the top panel 120. The touch panel 150 is one example of a coordinate detector which detects a position at which the user of the electronic device 100 touches the top panel 120. Hereinafter, the position is referred to as a position of the manipulation input.

The display panel 160 disposed under the touch panel 150 displays various GUI buttons or the like. Hereinafter, the various GUI buttons or the like are referred to as a GUI input part. The user of the electronic device 100 ordinarily touches the top panel 120 with a fingertip in order to manipulate (operate) the GUI input part.

The touch panel 150 is any coordinate detector as long as it can detect the position of the manipulation input onto the top panel 120 performed by the user. The touch panel 150 may be a capacitance type coordinate detector or a resistance film type coordinate detector, for example. Hereinafter, the embodiment in which the touch panel 150 is the capacitance type coordinate detector will be described. In a case where the touch panel 150 is the capacitance type, the touch panel 150 can detect the manipulation input performed onto the top panel 120 even if there is a clearance gap between the touch panel 150 and the top panel 120.

Although the top panel 120 is disposed on the manipulation input surface side of the touch panel 150 in the present embodiment, the top panel 120 may be integrated with the touch panel 150. In this case, the surface of the touch panel 150 is equal to the surface of the top panel 120 as illustrated in FIGS. 2 and 3, and the surface of the touch panel 150 becomes the manipulation input surface. Otherwise, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

In a case where the touch panel 150 is the capacitance type, the touch panel 150 may be disposed on the top panel 120. In this case, the surface of the touch panel 150 constitutes the manipulation input surface. In a case where the touch panel 150 is the capacitance type, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

The display panel 160 is a display part which displays a picture image. The display panel 160 may be a liquid crystal display panel, an organic Electroluminescence (EL) panel or the like, for example. The display panel 160 is disposed in the concave portion 110A of the housing 110 and is disposed on (the positive side in Z axis direction of) the substrate 170.

The display panel 160 is driven by a driver Integrated Circuit (IC) and displays the GUI input part, the picture image, characters, symbols, graphics or the like in accordance with an operating state of the electronic device 100.

The substrate 170 is disposed in the concave portion 110A of the housing 110. The display panel 160 and the touch panel 150 are disposed on the substrate 170. The display panel 160 and the touch panel 150 are fixed to the substrate 170 and the housing 110 by a holder or the like (not shown).

On the substrate 170, a drive control apparatus which will be described hereinafter and circuits or the like that are necessary for driving the electronic device 100 are mounted.

In the electronic device 100 having the configuration as described above, when the user touches the top panel 120 with the fingertip and a movement of the fingertip is detected, the drive controller mounted on the substrate 170 drives the vibrating element 140 so that the top panel 120 vibrates at a frequency in the ultrasound-frequency-band. The frequency in the ultrasound-frequency-band is a resonance frequency of a resonance system including the top panel 120 and the vibrating element 140. A standing wave is generated in the top panel 120 at the frequency.

The electronic device 100 generates the standing wave in the ultrasound-frequency-band in the top panel 120 and provides a tactile sensation (haptic sensation) to the user through the top panel 120.

Next, the standing wave generated in the top panel 120 is described with reference to FIG. 4.

Figure 4:
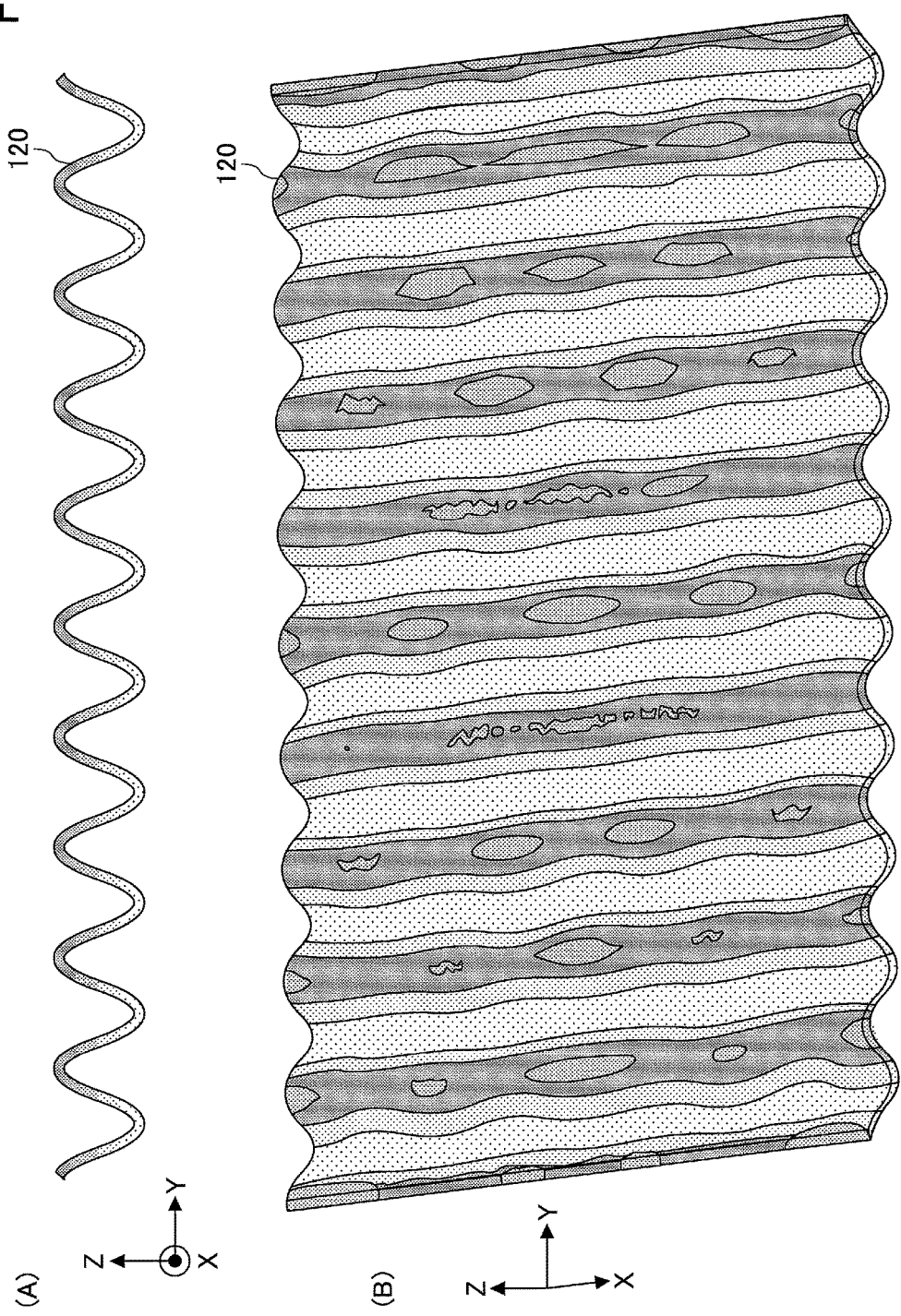
FIG. 4 is a diagram illustrating crests and troughs of standing wave formed in parallel with a short side of a top panel included in standing waves generated in the top panel by the natural vibration at the ultrasound-frequency-band.

FIG. 4 is a diagram illustrating crests and troughs of the standing wave formed in parallel with the short side of the top panel 120 included in the standing waves generated in the top panel 120 by the natural vibration at the ultrasound-frequency-band. A part (A) of FIG. 4 illustrates a side view, and a part (B) of FIG. 4 illustrates a perspective view. In parts (A) and (B) of FIG. 4, a XYZ coordinate system similar to that described in FIGS. 2 and 3 is defined. In parts (A) and (B) of FIG. 4, the amplitude of the standing wave is overdrawn in an easy-to-understand manner. The vibrating element 140 is omitted in parts (A) and (B) of FIG. 4.

The natural vibration frequency (the resonance frequency) f of the top panel 120 is represented by formulas (1) and (2) where E is the Young's modulus of the top panel 120, ρ is the density of the top panel 120, δ is the Poisson's ratio of the top panel 120, l is the long side dimension of the top panel 120, t is the thickness of the top panel 120, and k is a periodic number of the standing wave along the direction of the long side of the top panel 120. Since the standing wave has the same waveforms in every half cycle, the periodic number k takes values at 0.5 intervals. The periodic number k takes 0.5, 1, 1.5, 2 . . . .

$$f = \frac{\pi k^2 t}{l^2} \sqrt{\frac{E}{3\rho(1-\delta^2)}} \quad (1)$$

$$f = \alpha k^2 \quad (2)$$

The coefficient α included in formula (2) corresponds to coefficients other than $k^2$ included in formula (1).

A waveform of the standing wave as illustrated in parts (A) and (B) of FIG. 4 is obtained in a case where the periodic number k is 10, for example. In a case where a sheet of Gorilla (registered trademark) glass of which the length l of the long side is 140 mm, the length of the short side is 80 mm, and the thickness t is 0.7 mm is used as the top panel 120, for example, the natural vibration number f is 33.5 kHz, if the periodic number k is 10. In this case, a frequency of the drive signal is 33.5 kHz.

The top panel 120 is a planar member. If the vibrating element 140 (see FIGS. 2 and 3) is driven and the natural vibration at the ultrasound-frequency-band is generated in the top panel 120, the top panel 120 is bent as illustrated in parts (A) and (B) of FIG. 4. As a result, the standing wave is generated in the top panel 120.

In the present embodiment, the single vibrating element 140 is bonded on the surface of the top panel 120 which is located on the negative side in Z axis direction at the location along the short side extending in X axis direction at the positive side in Y axis direction. The electronic device 100 may include two vibrating elements 140. In a case where the electronic device 100 includes two vibrating elements 140, another vibrating element 140 may be bonded on the surface of the top panel 120 which is located on the negative side in Z axis direction at a location along the short side extending in X axis direction at a negative side in Y axis direction. In this case, the two vibrating elements 140 are disposed at locations that are axially symmetric with respect to a center line of the top panel 120 parallel to the two short sides of the top panel 120.

In a case where the electronic device 100 includes two vibrating elements 140, the two vibrating elements 140 are driven in the same phase, if the periodic number k is an integer number. If the periodic number k is a decimal fraction, the two vibrating elements 140 are driven in opposite phases.

Next, the natural vibration at ultrasound-frequency-band generated in the top panel 120 of the electronic device 100 is described with reference to FIG. 5.

Figure 5:
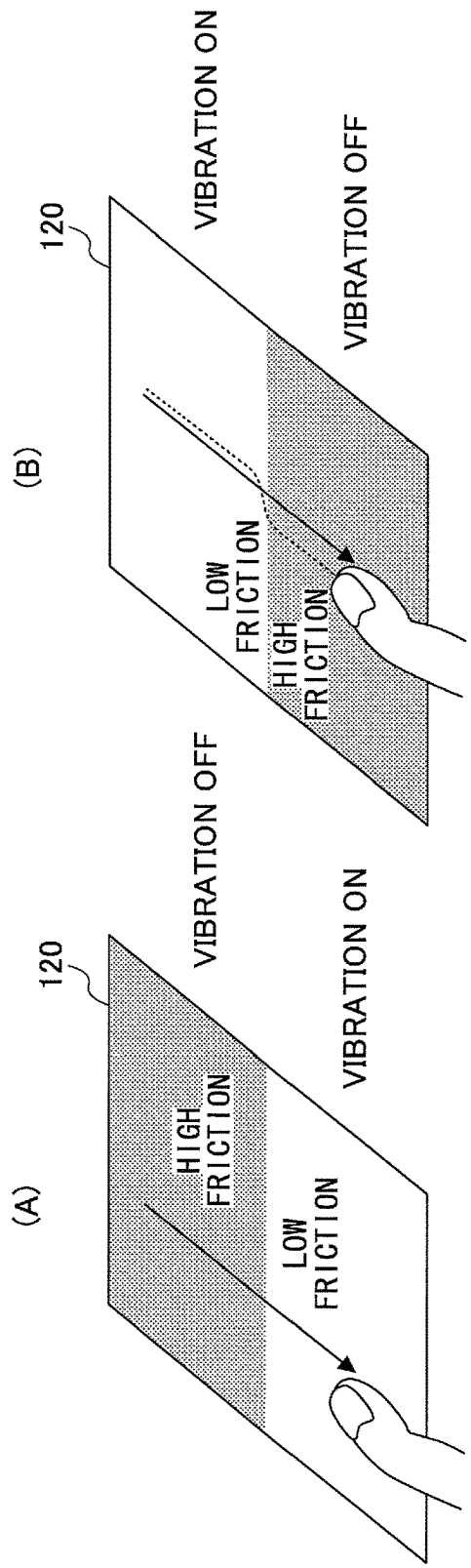
FIG. 5 is a diagram illustrating cases where a kinetic friction force applied to the fingertip varies when the natural vibration at the ultrasound-frequency-band is generated in the top panel of the electronic device.

FIG. 5 is a diagram illustrating cases where a kinetic friction force applied to the fingertip varies when the natural vibration at the ultrasound-frequency-band is generated in the top panel 120 of the electronic device 100. In FIG. 5, the manipulation input is performed with the fingertip. In parts (A) and (B) of FIG. 5, the user touches the top panel 120 with the fingertip and performs the manipulation input by tracing the top panel 120 with the fingertip in a direction from a far side to a near side with respect to the user. An on/off state of the vibration is switched by controlling an on/off state of the vibrating element 140 (see FIGS. 2 and 3).

In parts (A) and (B) of FIG. 5, areas in which the fingertip touches while the vibration is turned off are indicated in grey in the direction from the far side to the near side. Areas in which the fingertip touches while the vibration is turned on are indicated in white in the direction from the far side to the near side.

As illustrated in FIG. 4, the natural vibration at the ultrasound-frequency-band occurs on an entire surface of the top panel 120. Parts (A) and (B) of FIG. 5 illustrate operation patterns in which the on/off state of the natural vibration is switched while the fingertip of the user is tracing the top panel 120 in the direction from the far side to the near side.

Accordingly, in parts (A) and (B) of FIG. 5, the areas in which the fingertip touches while the vibration is turned off are indicated in grey in the direction from the far side to the near side. The areas in which the fingertip touches while the vibration is turned on are indicated in white in the direction from the far side to the near side.

In the operation pattern as illustrated in part (A) of FIG. 5, the vibration is turned off when the fingertip of the user is located on the far side of the top panel 120, and the vibration is turned on in the process of tracing the top panel 120 with the fingertip toward the near side.

On the contrary, in the operation pattern as illustrated in part (B) of FIG. 5, the vibration is turned on when the fingertip of the user is located on the far side of the top panel 120, and the vibration is turned off in the process of tracing the top panel 120 with the fingertip toward the near side.

In a state where the natural vibration at the ultrasound-frequency-band is generated in the top panel 120, a layer of air intervenes between the surface of the top panel 120 and the fingertip. The layer of air is provided by a squeeze film effect. As a result, a kinetic friction coefficient on the surface of the top panel 120 is decreased when the user traces the surface with the fingertip.

Accordingly, in the grey area located on the far side of the top panel 120 as illustrated in part (A) of FIG. 5, the kinetic friction force applied to the fingertip becomes larger. In the white area located on the near side of the top panel 120, the kinetic friction force applied to the fingertip becomes smaller.

Therefore, the user who is performing the manipulation input to the top panel 120 in a manner as illustrated in part (A) of FIG. 5 senses a reduction of the kinetic friction force applied to the fingertip when the vibration is turned on. As a result, the user senses a slippery or smooth touch (texture) with the fingertip. In this case, the user senses as if a concave portion is provided on the surface of the top panel 120 when the surface of the top panel 120 becomes slippery and the kinetic friction force becomes lower.

On the contrary, in the white area located on the far side of the top panel 120 as illustrated in part (B) of FIG. 5, the kinetic friction force applied to the fingertip becomes smaller. In the grey area located on the near side of the top panel 120, the kinetic friction force applied to the fingertip becomes higher.

Therefore, the user who is performing the manipulation input in the top panel 120 in a manner as illustrated in part (B) of FIG. 5 senses an increase of the kinetic friction force applied to the fingertip when the vibration is turned off. As a result, the user senses a grippy or scratchy touch (texture) with the fingertip. In this case, the user senses as if a convex portion is provided on the surface of the top panel 120 when the surface of the top panel 120 becomes grippy and the kinetic friction force becomes higher.

Accordingly, the user can sense a concavity or convexity with the fingertip in cases as illustrated in parts (A) and (B) of FIG. 5. For example, "The Printed-matter Typecasting Method for Haptic Feel Design and Sticky-band Illusion" (The collection of papers of the 11$^{th}$ SICE system integration division annual conference (SI2010, Sendai)_174-177, 2010-12) discloses that a human can sense a concavity or a convexity. "Fishbone Tactile Illusion" (Collection of papers of the 10th Congress of The Virtual Reality Society of Japan (September, 2005)) discloses that a human can sense a concavity or a convexity as well.

Although a variation of the kinetic friction force when the vibration is switched on or off is described above, a variation of the kinetic friction force similar to those described above is obtained when the amplitude (intensity) of the vibrating element 140 is varied.

In the following, a configuration of the electronic device 100 according to the embodiment is described with reference to FIG. 6.

Figure 6:
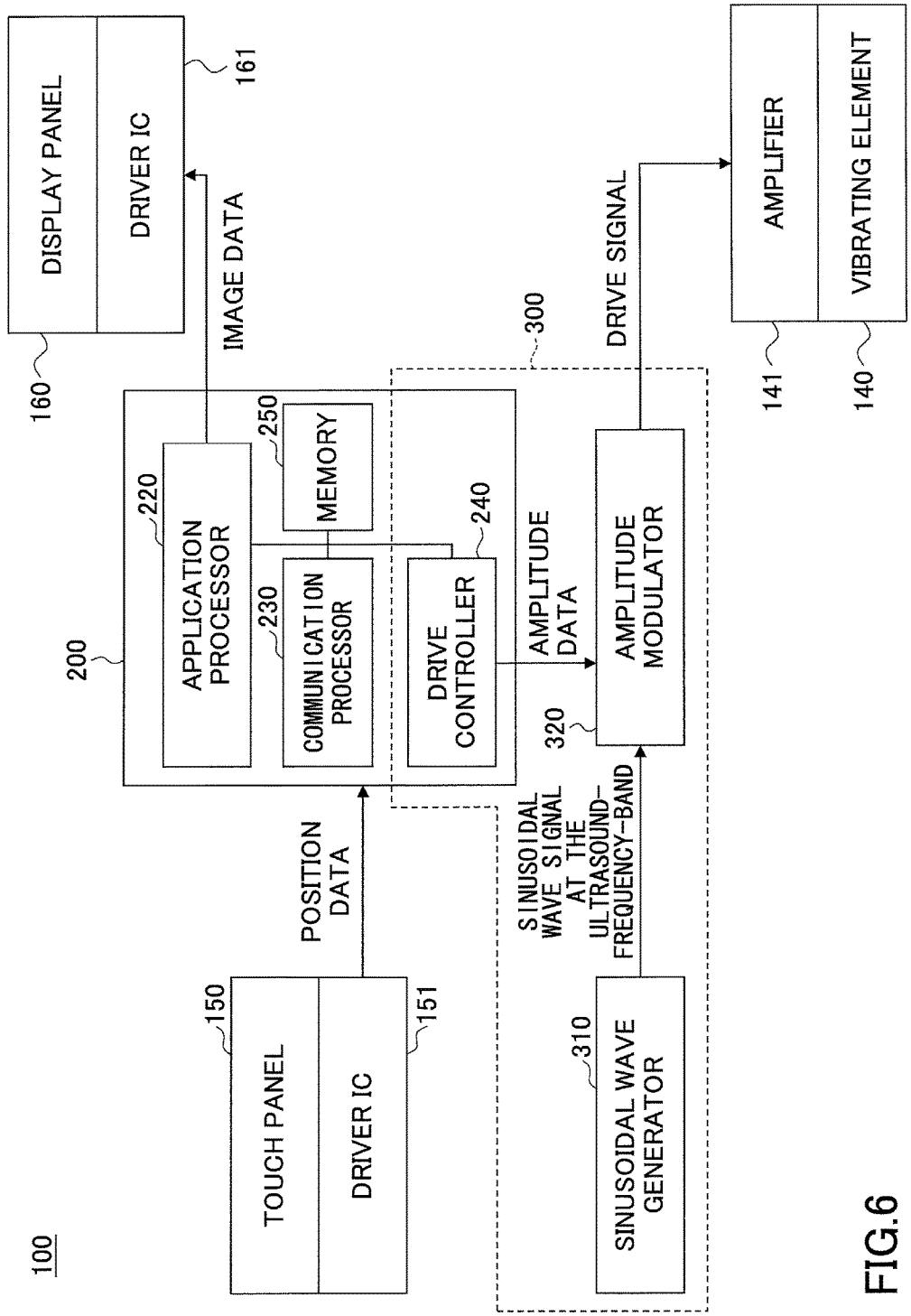
FIG. 6 is a diagram illustrating a configuration of the electronic device according to the first embodiment.

FIG. 6 is a diagram illustrating the configuration of the electronic device 100 according to the embodiment.

The electronic device 100 includes the vibrating element 140, an amplifier 141, the touch panel 150, a driver Integrated Circuit (IC) 151, the display panel 160, a driver IC 161, a controller 200, a sinusoidal wave generator 310 and the amplitude modulator 320.

The controller 200 includes an application processor 220, a communication processor 230, a drive controller 240 and a memory 250. The controller 200 is realized by an IC chip, for example.

The drive controller 240, the sinusoidal wave generator 310 and the amplitude modulator 320 constitute a drive control apparatus 300. Although an embodiment in which the application processor 220, the communication processor 230, the drive control part 240 and the memory 250 is included in the single controller 200 is described, the drive control part 240 may be disposed outside of the controller 200 and realized by another IC chip or a processor. In this case, data which is necessary for a drive control performed by the drive controller 240 among data stored in the memory 250 may be stored in another memory disposed in the drive control apparatus 300.

In FIG. 6, the housing 110, the top panel 120, the double-faced adhesive tape 130 and the substrate 170 (see FIG. 2) are omitted. Herein, the amplifier 141, the driver IC 151, the driver IC 161, the drive controller 240, the memory 250, the sinusoidal wave generator 310 and the amplitude modulator 320 are described.

The amplifier 141 is disposed between the drive control apparatus 300 and the vibrating element 140. The amplifier 141 amplifies the drive signal output from the drive control apparatus 300 and drives the vibrating element 140.

The driver IC 151 is connected to the touch panel 150. The driver IC 151 detects position data representing the position on the touch panel 150 at which the manipulation input is performed and outputs the position data to the controller 200. As a result, the position data is input to the application processor 220 and the drive controller 240. Inputting the position data to the drive controller 240 is equal to inputting the position data to the drive control apparatus 300.

The driver IC 161 is connected to the display panel 160. The driver IC 161 outputs image data input from the drive control apparatus 300 to the display panel 160 and displays a picture image to the display panel 160 based on the image data. Accordingly, the GUI input part, the picture image and the like are displayed on the display panel 160 based on the image data.

The application processor 220 executes various application programs included in the electronic device 100. The application processor 220 is one example of an application executing part.

The communication processor 230 performs processes that are necessary for communications of 3rd Generation (3G), 4th Generation (4G), Long Term Evolution (LTE), WiFi or the like of the electronic device 100.

The drive controller 240 outputs amplitude data to the amplitude modulator 320 in response to presence or absence of the manipulation input and the travel distance of the position of the manipulation input. The amplitude data represents an amplitude value used for controlling an intensity of the drive signal used for driving the vibrating element 140.

The drive controller 240 switches on and off the vibrating element 140 every time the travel distance of the position of the manipulation input reaches a unit travel distance of the GUI input part or the like when the manipulation input is performed in a display area of the GUI input part or the like displayed by a running application. The kinetic friction force applied to the fingertip of the user varies when the vibration of the top panel 120 is switched on and off. The reason why the drive controller 240 switches on and off the vibrating element 140 as described above is for the sake of informing the user of the manipulation through the tactile sensation.

Positions of the GUI input parts displayed on the display panel 160, areas in which the picture images are displayed or areas in which entire pages are displayed are identified by area data which represents locations on the display panel 160. The area data is assigned to all the GUI input parts displayed on the display panel 160, all the areas in which the picture images are displayed and all the areas in which entire pages are displayed. The area data is assigned to all the GUI input parts and all the areas that are used in all application programs. Since images displayed on the display panel 160 are different depending on types of the applications, the area data are allocated to the types of the applications.

The drive controller 240 determines whether the position represented by the position data input from the driver IC 151 is located in the designated area which requires generating the vibration by using the area data. All of the GUI input parts displayed on the display panel 160 are different depending on types of the applications. Accordingly, every application determines whether the GUI input part is performed in the designated area.

The memory 250 stores control data in which data representing the types of the application, area data, pattern data representing vibration patterns, and data representing designated distance D are associated with each other. The area data represents coordinate values of areas in which the GUI input part or the like is displayed. The manipulation input is performed onto the GUI input part or the like. The designated distance D will be described hereinafter.

The memory 250 stores data and programs that are necessary for the application processor 220 to execute the application program and data and programs that are necessary for the communication processor 230 to perform a communication processing.

The sinusoidal wave generator 310 generates sinusoidal waves used for generating the drive signal which causes the top panel 120 to vibrate at the natural vibration number. For example, when causing the top panel 120 to vibrate at a natural vibration frequency f of 33.5 kHz, the frequency of the sinusoidal wave is 33.5 kHz. The sinusoidal wave generator 310 inputs a sinusoidal wave signal at the ultrasound-frequency-band to the amplitude modulator 320.

The amplitude modulator 320 generates the drive signal by modulating an amplitude of the sinusoidal wave signal input from the sinusoidal wave generator 310 based on the amplitude data input from the drive controller 240. The amplitude modulator 320 modulates only the amplitude of the sinusoidal wave signal at the ultrasound-frequency-band input from the sinusoidal wave generator 310 and does not modulate a frequency and a phase of the sinusoidal wave signal in order to generate the drive signal.

Therefore, the drive signal output from the amplitude modulator 320 is a sinusoidal wave signal at the ultrasound-frequency-band obtained by modulating only the amplitude of the sinusoidal wave signal at the ultrasound-frequency-band output from the sinusoidal wave generator 310. In a case where the amplitude data is zero, the amplitude of the drive signal becomes zero. This is the same as the amplitude modulator 320 that does not output the drive signal.

In the following, the control data stored in the memory 250 is described with reference to FIG. 7.

FIG. 7 is a diagram illustrating the control data stored in the memory 250.

The memory 250 stores the control data as illustrated in FIG. 7. In the control data, the data representing the types of the application, the area data, the pattern data representing the vibration patterns, and the data representing the designated distance D are associated with each other. The area data represents coordinate values of areas in which the GUI input part or the like is displayed. The manipulation input is performed onto the GUI input part or the like.

In FIG. 7, application program identification (ID) is illustrated as the data representing the type of the application program. Formulas f1 to f4 representing the coordinate values of the GUI input parts or the like to which the manipulation inputs are performed are illustrated as the area data. P1 to P4 are illustrated as the pattern data representing the vibration patterns. D1 to D4 are illustrated as the distance data representing the designated distance D.

The pattern data P1 to P4 may be divided into two types, i.e. a first pattern data and a second pattern data, for example. The first pattern data represents a driving pattern in which the vibrating element 140 is switched off when the travel distance of the manipulation input reaches the unit travel distance of the GUI input part or the like. In the first pattern, the vibrating element 140 is turned on before the travel distance of the manipulation input reaches the unit travel distance of the GUI input part or the like. The second pattern data represents a driving pattern in which the vibrating element 140 is switched on when the travel distance of the manipulation input reaches the unit travel distance of the GUI input part or the like. In the second pattern, the vibrating element 140 is turned off before the travel distance of the manipulation input reaches the unit travel distance of the GUI input part or the like.

The first pattern data represents the driving pattern which provides the tactile sensation of convexity to the user's fingertip by switching off the vibration of the top panel 120 when the travel distance of the manipulation input reaches the unit travel distance of the GUI input part or the like.

The second pattern data represents the driving pattern which provides the tactile sensation of concavity to the user's fingertip by switching on the vibration of the top panel 120 when the travel distance of the manipulation input reaches the unit travel distance of the GUI input part or the like.

The distance data D1 to D4 represent designated distances D. The distance data D1 to D4 represent unit travel distances of GUI input parts such as a dial type GUI input part, slide type GUI input part or the like. The unit travel distance represents a distance which is necessary for performing the manipulation input of a minimum amount of the GUI input parts such as the dial type GUI input part, the slide type GUI input part or the like. The minimum amount corresponds to one section located between two scale marks adjacent to each other. For example, the unit travel distance of the slider 102B is a distance (a distance of the one section) between two scale marks of the slider 102B adjacent to each other.

Since the GUI input parts identified by the area data f1 to f4 have the different minimum amounts (the one section) with each other, the distance data D1 to D4 are allocated to the area data f1 to f4, respectively.

The applications identified by the application IDs include various applications that can be used in a smart phone or tablet computer. The application IDs are included in the control data stored in the memory 250.

In the following, processes executed by the drive controller 240 of the drive control apparatus 300 included in the electronic device 100 according to the first embodiment are described with reference to FIG. 8.

Figure 8:
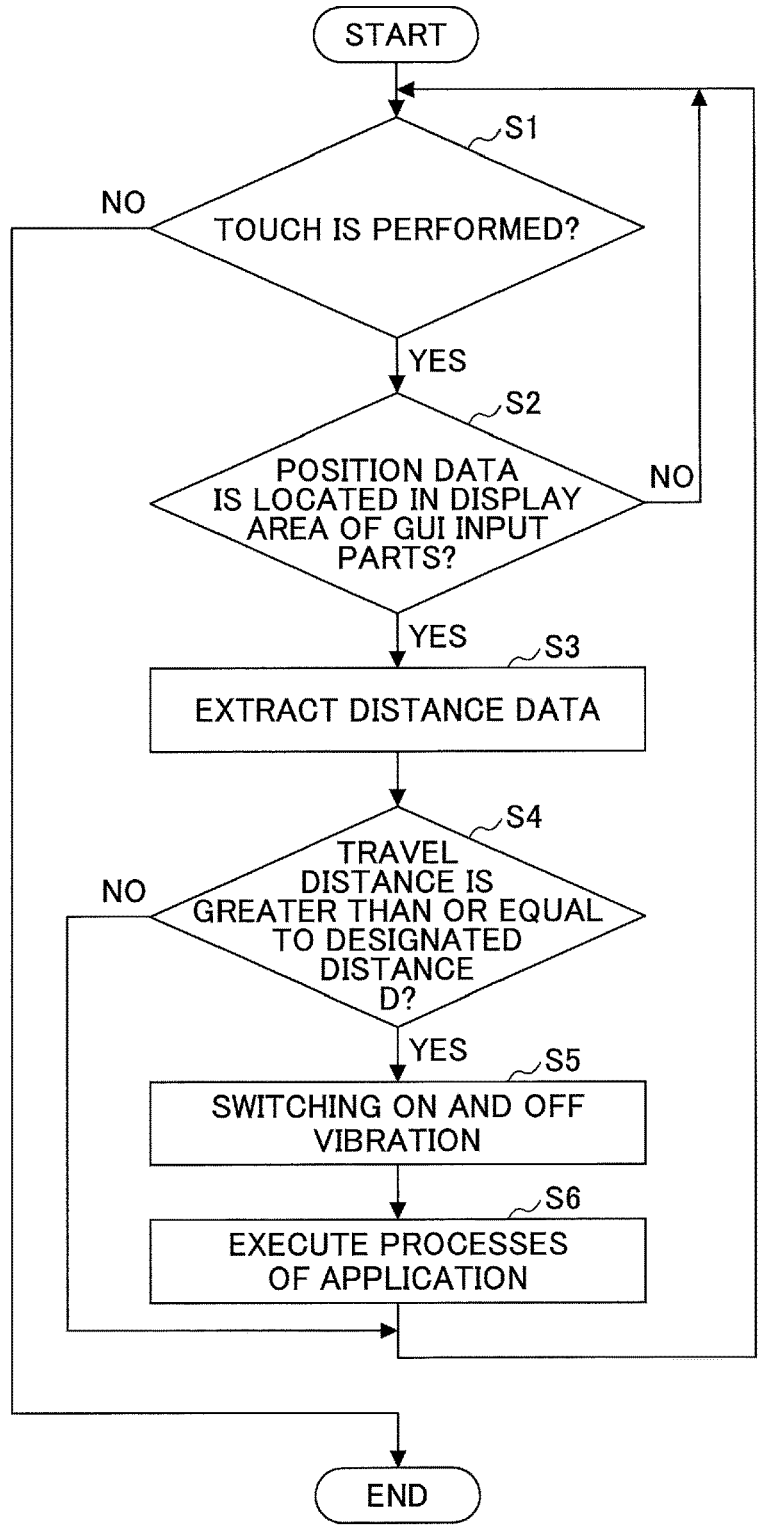
FIG. 8 is a diagram illustrating a flowchart executed by a drive controller of a drive control apparatus included in the electronic device 100 according to the first embodiment.

FIG. 8 is a diagram illustrating a flowchart executed by the drive controller 240 of the drive control apparatus 300 included in the electronic device 100 according to the first embodiment.

An operating system (OS) of the electronic device 100 executes drive controls of the electronic device 100 at every designated control cycle. Accordingly, the drive control apparatus 300 performs the processing at every designated control cycle. The same applies to the drive controller 240. The drive controller 240 executes the flows as illustrated in FIG. 8 at every designated control cycle.

Suppose that the period of time required from the point in time when the position data is input to the drive control apparatus 300 to the point in time when the drive signal is calculated by the drive controller 240 based on the position data is $\Delta t$, the required period of time $\Delta t$ is almost equal to a period of the single control cycle.

A period of time of one cycle of the control cycle can be treated as a period of time corresponding to the required period of time $\Delta t$ which is required from the point in time when the position data is input to the drive control apparatus 300 from the driver IC 151 to the point in time when the drive signal is calculated based on the position data.

The drive controller 240 starts processing when the electronic device 100 is turned on.

The drive controller 240 determines whether the touch is performed (step S1). Presence or absence of the touch is determined based on whether the position data is input to the drive controller 240 from the driver IC 151 (see FIG. 6).

If the drive controller 240 determines at step S1 that the touch is performed (S1: YES), the drive controller 240 determines whether the coordinate represented by the present position data is located in the display area of any one of the GUI input parts or the like associated with the running application (step S2). The present position data represents the coordinate at which the user is performing the manipulation input at present.

If the drive controller 240 determines at step S2 that the coordinate represented by the present position data is located in the display area of any one of the GUI input parts or the like (S2: YES), the drive controller 240 extracts the distance data representing the designated distance D corresponding to the GUI input parts or the like that includes the coordinate of the present position data from the control data (step S3). The drive controller 240 sets the distance data extracted from the control data as a value used for a determination at step S4.

The drive controller 240 determines whether the travel distance of the position data is greater than or equal to the designated distance D (step S4). The travel distance of the position data is obtained as a difference between the position data obtained at step S1 of the previous control cycle and the position data obtained at step S1 of the present control cycle.

Since the flow as illustrated in FIG. 8 is repeatedly executed by the OS of the electronic device 100 at every control cycle, the drive controller 240 calculates the travel distance of the position data based on the difference between the position data obtained at step S1 of the previous control cycle and the position data obtained at step S1 of the present control cycle. The drive controller 240 determines whether the calculated travel distance of the position data is greater than or equal to the designated distance D.

The travel distance of the position data may not be limited to the travel distance obtained when the user moves, for example, the slider 102B in one direction, but may be the travel distance obtained when the user moves the slider 102B in a direction opposite to the one direction. For example, the drive controller 240 determines whether the calculated travel distance is greater than or equal to the designated distance D in a case when the user returns the slider 102B to the left after moving the slider 102B from left to right.

If the drive controller 240 determines that the travel distance of the position data is greater than or equal to the designated distance D (S4: YES), the drive controller 240 switches on and off the vibrating element 140 (step S5). The process at step S5 is performed by switching on and off the vibrating element 140 in order to change the tactile sensation provided to the user's fingertip when the travel distance of the manipulation input becomes greater than or equal to the designated distance D corresponding to the unit travel distance.

For example, in a case where the vibrating element 140 is switched off, it is possible to provide the tactile sensation of the convexity to the user's fingertip. On the contrary, in a case where the vibrating element 140 is switched on, it is possible to provide the tactile sensation of the concavity to the user's fingertip.

The tactile sensation provided to the user's fingertip touching the top panel 120 is changed by switching on and off the vibrating element 140. As a result, the user recognizes that the travel distance of the manipulation input reaches the unit travel distance through the tactile sensation.

The drive controller 240 causes the application processor 220 (see FIG. 6) to execute the processes of the application (step S6). For example, in a case where the running application displays the slider 102B used as a volume switch for controlling a sound volume, if the user performs the manipulation input so as to control the sound volume, the application processor 220 controls the sound volume.

At step S4, if the drive controller 240 determines that the travel distance of the position data is not greater than or equal to the designated distance D (S4: NO), the drive controller 240 returns the flow to step S1. Since the travel distance does not reach the designated distance D, the drive controller 240 does not switch on or off the vibrating element 140.

If the drive controller 240 determines at step S2 that the coordinate represented by the present position data is not located in the display area of any one of the GUI input parts or the like (S2: NO), the drive controller 240 returns the flow to step S1. Since the coordinate represented by the present position data is not located in the display area of the GUI input part or the like, there is no need to switch on or off the vibrating element 140 and the flow proceeds to steps S3 and S4.

At step S1, if the drive controller 240 determines that the touch is not performed (S1: NO), the drive controller 240 finishes the drive control constituted by the flow as illustrated in FIG. 8 (END). In a case where the drive controller 240 is driving the vibrating element 140 before determining that the touch is not performed, the drive controller 240 stops driving the vibrating element 140. In order to stop driving the vibrating element 140, the drive controller 240 sets the amplitude value of the drive signal to zero.

The control processes as illustrated in FIG. 8 are repeatedly performed at every control cycle. Every time the travel distance reaches the unit travel distance while the user moves the fingertip touching the GUI input parts or the like, the vibration of the top panel 120 is switched on and off. Therefore, it is possible to provide the tactile sensation of the convexity or the concavity to the user's fingertip and to make the user recognize that the travel distance reaches the unit travel distance through the tactile sensation.

Every time the travel distance reaches the unit travel distance, the processes of the application are executed.

If the user gets the fingertip off of the top panel 120, the drive control part 240 finishes all of the processes.

Figure 9:
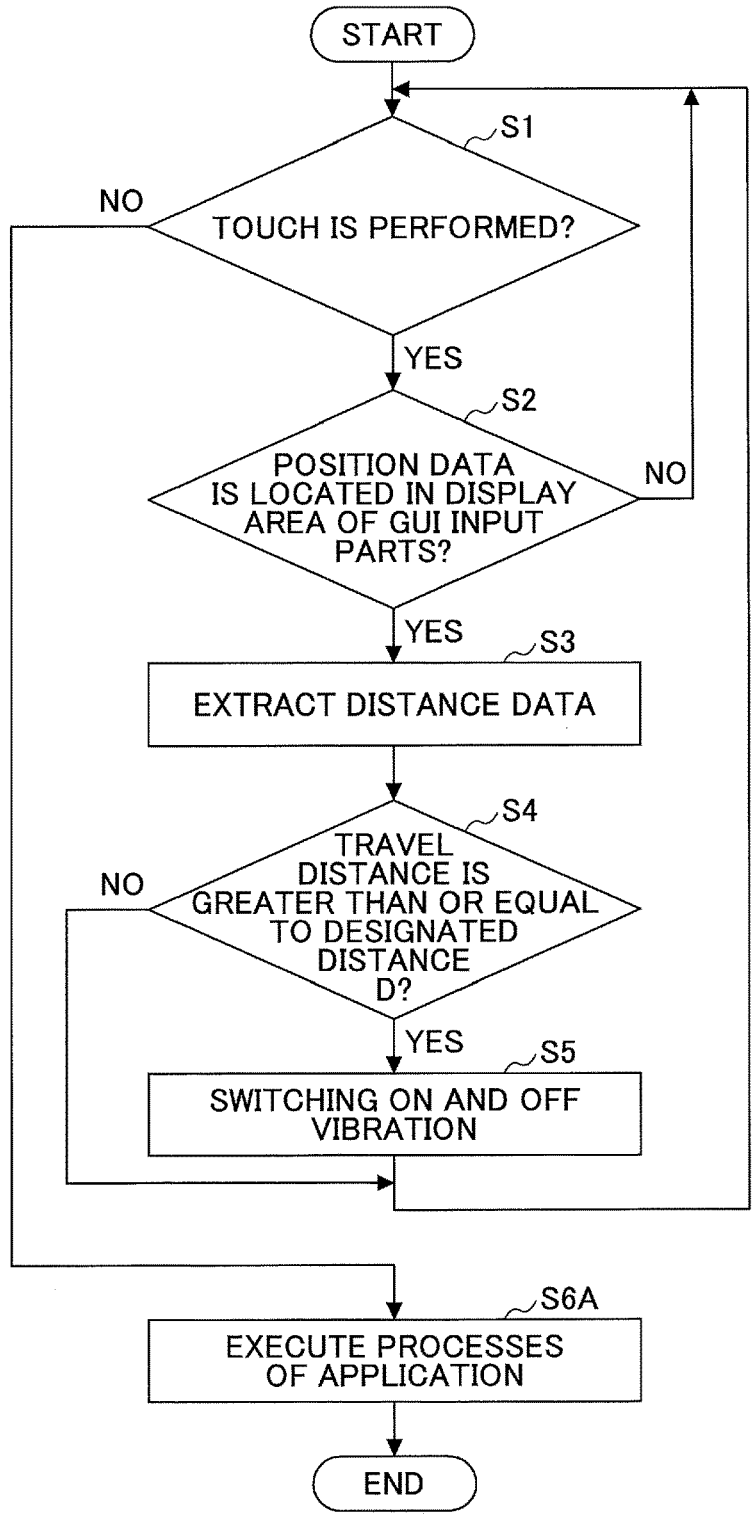
FIG. 9 is a diagram illustrating a flowchart executed by the drive controller of the drive control apparatus included in the electronic device according to the first embodiment.

According to the control processes of the flow chart as illustrated in FIG. 8, every time the travel distance reaches the unit travel distance, the processes of the application are executed. However the processes of the application may be executed upon completion of the user's manipulation input. FIG. 9 illustrates such a flow.

FIG. 9 is a diagram illustrating a flowchart executed by the drive controller 240 of the drive control apparatus 300 included in the electronic device 100 according to the first embodiment.

Steps S1 to S5 as illustrated in FIG. 9 are similar to steps S1 to S5 as illustrated in FIG. 8.

According to the flow as illustrated in FIG. 9, the drive controller 240 returns the flow to step S1 upon finishing step S5. At step S1, if the drive controller 240 determines that the touch is not performed (S1: NO), the drive controller 240 goes to step S6A.

According to the flow as illustrated in FIG. 9, the drive controller 240 causes the application processor 220 (see FIG. 6) to execute the processes of the application at step S6A after the user completes the manipulation input and gets the fingertip off of the top panel 120.

The control processes as illustrated in FIG. 9 are repeatedly performed at every control cycle. Every time the travel distance reaches the unit travel distance while the user is moving the fingertip touching the GUI input parts or the like, the vibration of the top panel 120 is switched on and off. This is the same as the processes as illustrated in FIG. 8.

However, according to the control processes as illustrated in FIG. 9, the processes of the application are executed when the user completes the manipulation input and gets the fingertip off of the top panel 120.

The drive controller 240 of the drive control apparatus 300 included in the electronic device 100 of the first embodiment performs the drive control of the vibrating element 140 in accordance with the control processes as illustrated in FIG. 8 or FIG. 9.

According to the control processes of FIG. 8 or FIG. 9, the drive controller 240 determines whether the travel distance reaches the unit travel distance by using the distance data representing the designated distance D included in control data. However the drive controller 240 may switch on and off the vibrating element 140 when the travel distance gains the designated distance D without using the distance data representing the designated distance D included in control data.

For example, in a case where there is the only one designated distance D or in a case where the only one designated distance D is associated for the plurality of the GUI input parts, it is not necessary for the control data to include the distance data representing the designated distance D. In these cases, the drive controller 240 may not use the designated distance D represented by the distance data included in the control data, but may hold a fixed value representing the designated distance D.

In the following, examples of the operating states of the electronic device 100 according to the first embodiment are described with reference to FIGS. 10 to 17.

FIGS. 10 to 17 are diagrams illustrating the examples of the operating states of the electronic device 100 according to the first embodiment. In FIGS. 10 to 17, XYZ coordinate systems similar to that described in FIGS. 2 and 4 are defined.

Figure 10:
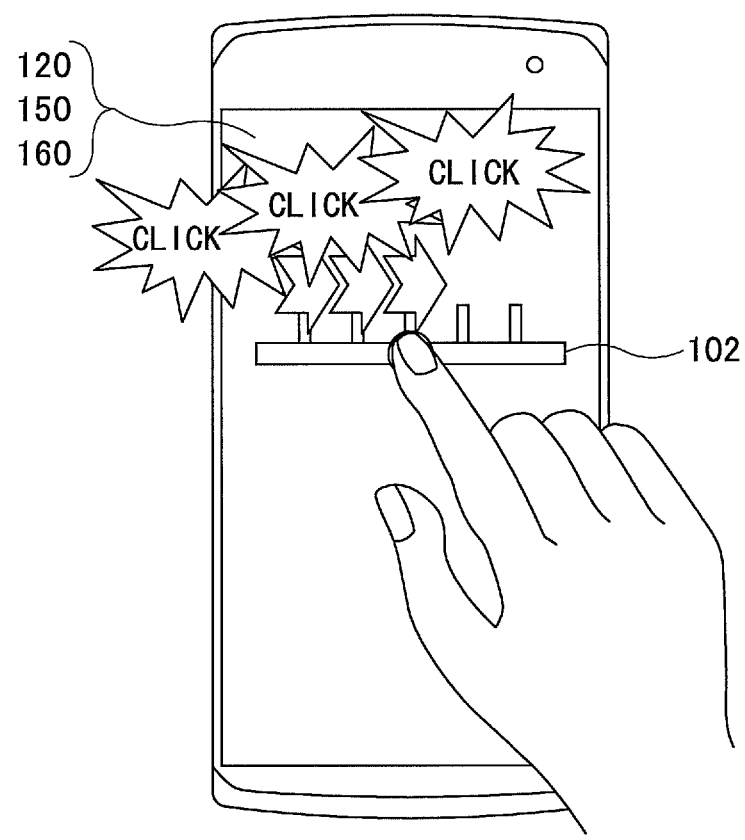
FIG. 10 is a diagram illustrating an example of an operating state of the electronic device according to the first embodiment.

FIG. 10 illustrates an operation mode in which a slider 102 is used for controlling a designated level in a state where a designated application is running. The slider 102 can be used for controlling the designated level on a scale of one to five. Thus, the slider 102 has five scale marks.

Before the user moves the slider 102, the natural vibration is generated on the top panel 120 while the user's fingertip is touching the top panel 120. The top panel 120 is in a slippery condition for the user's fingertip.

Herein, every time the slider 102 reaches the scale mark, the vibration of the top panel 120 is switched off so that the top panel 120 becomes in a non-slippery (grippy) condition for the user's fingertip. Accordingly, the tactile sensation as if the convexity exists on the surface of the top panel 120 is provided for the user. The vibrating element 140 is driven in accordance with the driving pattern which provides the tactile sensation as described above to the user. The tactile sensation as if the convexity exists on the surface of the top panel 120 provides a clicky sensation to the user.

Distances between two adjacent scale marks of the slider 102 are equal to each other. A distance between a left end of the slider 102 and the first scale mark from the left is equal to each of the distances. The designated distance D used at step S2 of the flow chart as illustrated in FIG. 8 is set to the distance of the one section.

In such an operation mode, as the user drags the slider 102 rightward from the left end and the slider 102 reaches the third scale mark, the drive controller 240 switches off the vibrating element 140 every time the slider 102 reaches the scale mark. When the drive controller 240 switches off the vibrating element 140, the natural vibration of the top panel 120 is switched off.

Accordingly, the drive control apparatus 300 can provide the tactile sensation of the convexity to the user's fingertip every time the user moves the fingertip to the first, second and third scale marks from the left end of the slider 102.

Figure 11:
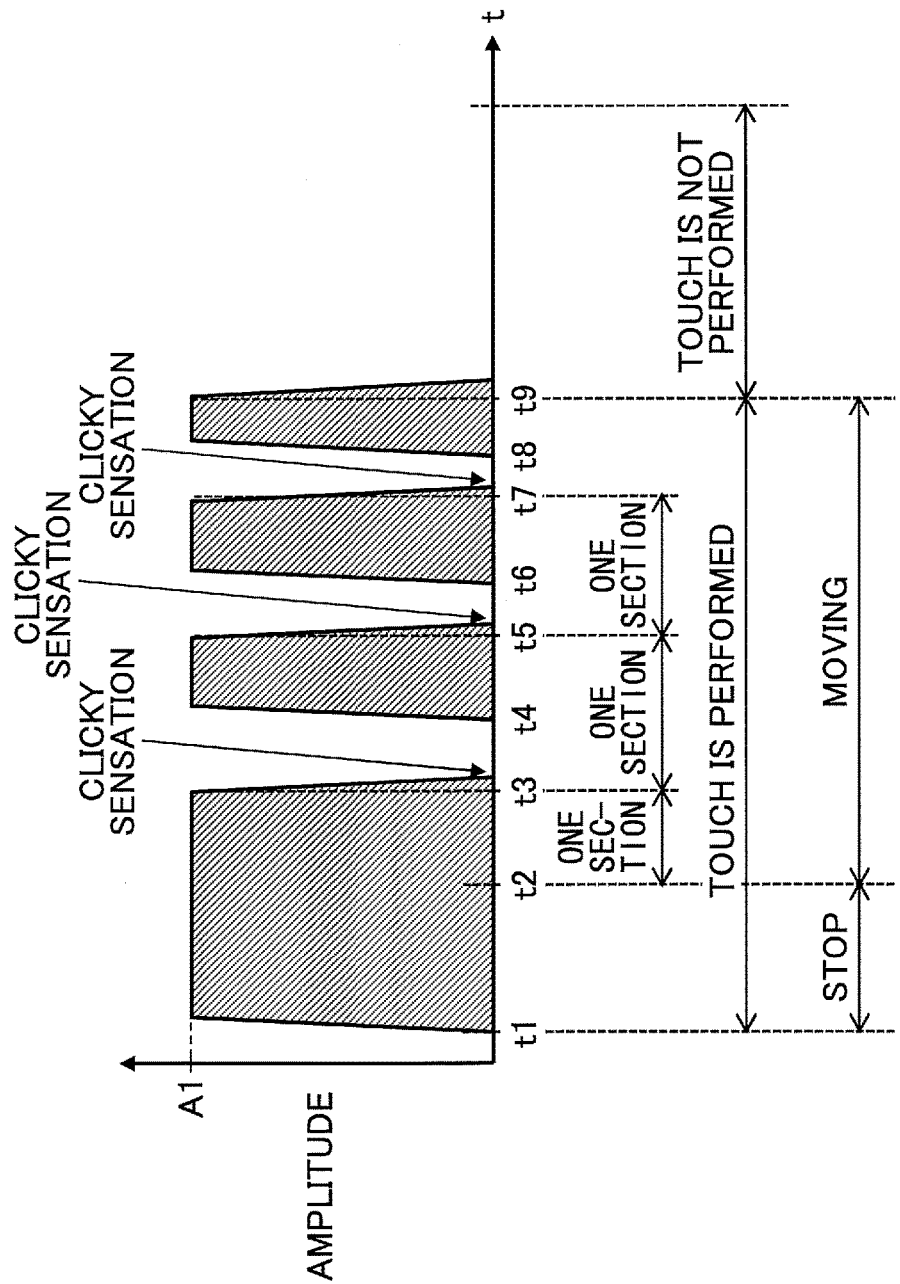
FIG. 11 is a diagram illustrating an example of an operating state of the electronic device according to the first embodiment.

Hereinafter, the driving pattern as described above will be described with reference to FIG. 11. In FIG. 11, the top panel 120 is vibrated at the natural vibration number of 33.5 kHz.

As illustrated in FIG. 11, when the user's fingertip touches the slider 102 at time t1, the drive controller 240 drives the vibrating element 140 and then the natural vibration is generated on the top panel 120. At time t1, the natural vibration having an amplitude A1 is generated on the top panel 120.

The user stops the fingertip from time t1 to time t2. Accordingly, the natural vibration having the amplitude A1 is generated on the top panel 120 from time t1 to time t2. The user starts moving the fingertip at time t2. As the fingertip reaches the first scale mark at time t3, the travel distance of the fingertip reaches the designated distance D. Therefore the drive controller 240 switches off the vibrating element 140. Accordingly, the amplitude of the vibration of the top panel 120 becomes zero right after time t3. The user can obtain the tactile sensation as if the convexity exists on the surface of the top panel 120 through the fingertip and recognize that the fingertip has reached the first scale mark from the left end.

As the user keeps moving the slider 102 rightward, the drive controller 240 drives the vibrating element 140 at time t4 and then the natural vibration having the amplitude A1 is generated on the top panel 120. A period of time from time t3 to time t4 during which the drive signal of the vibrating element 140 is turned off is 50 ms, for example.

As the fingertip reaches the second scale mark at time t5, the travel distance of the fingertip reaches the designated distance D. Accordingly, the drive controller 240 switches off the vibrating element 140. Accordingly, the amplitude of the vibration of the top panel 120 becomes zero right after time t5. The user can obtain the tactile sensation as if the convexity exists on the surface of the top panel 120 through the fingertip and recognize that the fingertip has reached the second scale mark from the left end.

As the user keeps moving the slider 102 rightward, the drive controller 240 drives the vibrating element 140 at time t6 and then the natural vibration having the amplitude A1 is generated on the top panel 120. A period of time from time t5 to time t6 during which the drive signal of the vibrating element 140 is turned off is 50 ms, for example.

As the fingertip reaches the third scale mark at time t7, the travel distance of the fingertip reaches the designated distance D. Accordingly, the drive controller 240 switches off the vibrating element 140. Accordingly, the amplitude of the vibration of the top panel 120 becomes zero right after time t7. The user can obtain the tactile sensation as if the convexity exists on the surface of the top panel 120 through the fingertip and recognize that the fingertip has reached the third scale mark from the left end.

As the user keeps moving the slider 102 rightward, the drive controller 240 drives the vibrating element 140 at time t8 and then the natural vibration having the amplitude A1 is generated on the top panel 120. A period of time from time t7 to time t8 during which the drive signal of the vibrating element 140 is turned off is 50 ms, for example.

As the user gets the fingertip off of the top panel 120 at time t9, the drive controller 240 switches off the vibrating element 140. Accordingly, the amplitude of the vibration of the top panel 120 becomes zero right after time t9.

After that, the user does not touch the top panel 120. Accordingly, the amplitude of the vibration of the top panel 120 is zero and the top panel 120 remains without the vibration.

As described above, the drive control apparatus 300 can provide the tactile sensation of the convexity to the user's fingertip every time the user moves the fingertip to the first, second and third scale marks from the left end of the slider 102.

Accordingly the user can obtain the tactile sensation as if the convexity exists on the surface of the top panel 120 through the fingertip and recognize that the fingertip has reached each scale mark from.

In FIG. 11, the drive control apparatus 300 drives the vibrating element 140 at time t1 when the user's fingertip touches the slider 102 and thereby generating the natural vibration on the top panel 120. The drive control apparatus 300 switches off the vibrating element 140 when the travel distance of the fingertip reaches the designated distance D so as to provide the tactile sensation as if the convexity exists on the top panel 120.

Figure 12:
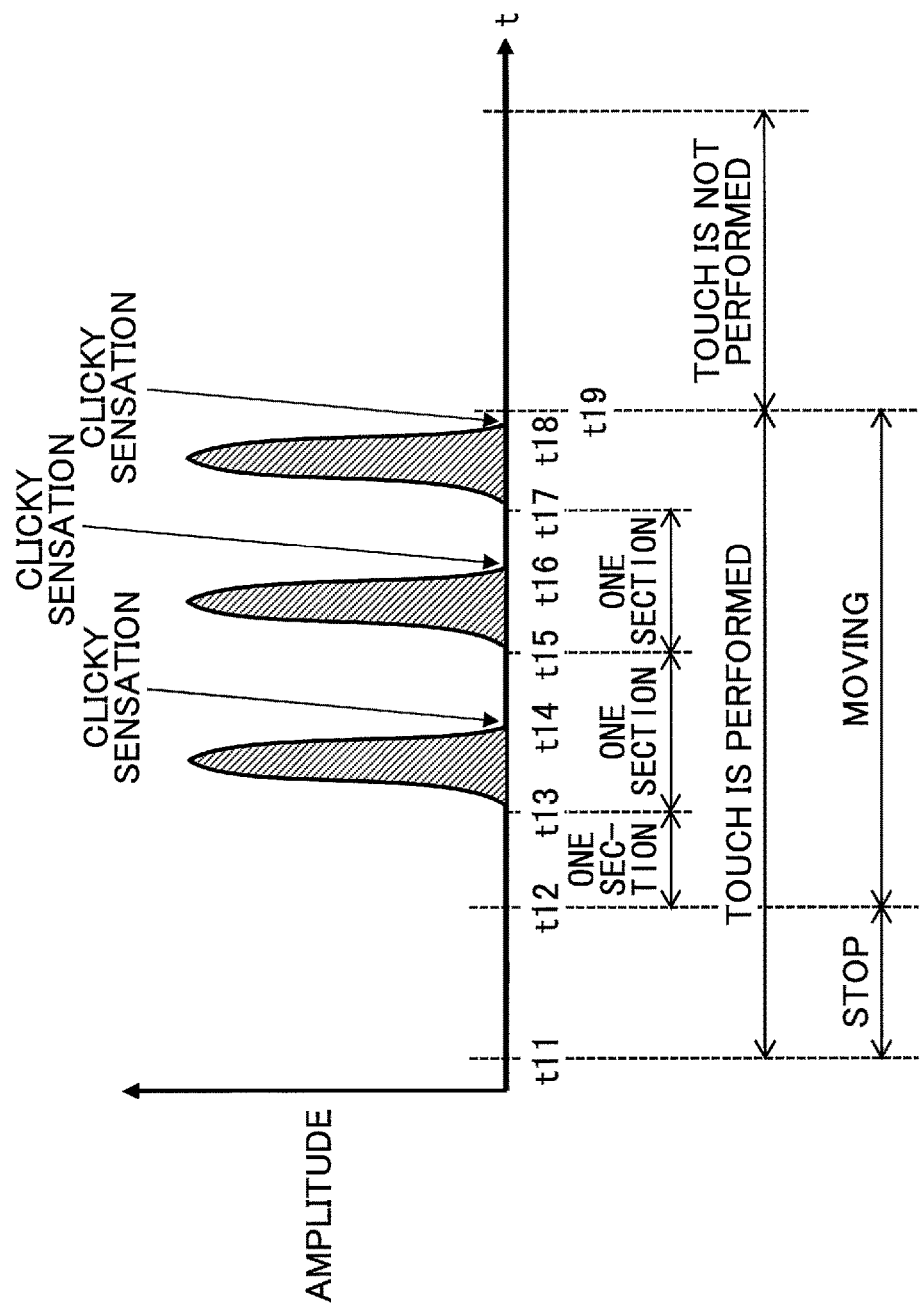
FIG. 12 is a diagram illustrating an example of an operating state of the electronic device according to the first embodiment.

However, switching on and off of the driving pattern as illustrated in FIG. 11 may be inverted. Accordingly, the drive control apparatus 300 may not generate the natural vibration on the top panel 120 when the user's fingertip touches the slider 102. FIG. 12 illustrates such a driving pattern.

As illustrated in FIG. 12, the user's fingertip touches the slider 102 at time t1. At this time, the drive controller 240 does not drive the vibrating element 140. Thus the natural vibration is not generated on the top panel 120.

The user stops the fingertip from time t11 to time t12. Accordingly, the top panel 120 remains without the natural vibration from time t11 to time t12. The user starts moving the fingertip at time t12. As the fingertip reaches the first scale mark at time t13, the travel distance of the fingertip reaches the designated distance D. Therefore the drive controller 240 switches on the vibrating element 140. Accordingly, the amplitude of the vibration of the top panel 120 rises up right after time t13. The amplitude of the top panel 120 rises up gradually in some degree as illustrated in FIG. 12. The user can obtain the tactile sensation as if the concavity exists on the top panel 120 through the fingertip.

As the user keeps moving the slider 102 rightward, the drive controller 240 switches off the vibrating element 140 at time t14 and then the natural vibration of the top panel 120 is turned off. The user can obtain the tactile sensation as if the convexity exists on the top panel 120 through the fingertip. A period of time from time t13 to time t14 during which the drive signal of the vibrating element 140 is turned on is 100 ms, for example.

Since the period of time from time t13 to time t14 is a very short time such as 100 ms, the user feels the convexity and the concavity through the fingertip and can recognize that the fingertip has reached the first scale mark from the left end.

As the fingertip reaches the second scale mark at time t15, the travel distance of the fingertip reaches the designated distance D. Accordingly, the drive controller 240 switches on the vibrating element 140. Accordingly, the amplitude of the vibration of the top panel 120 rises up right after time t15. The user can obtain the tactile sensation as if the concavity exists on the top panel 120 through the fingertip.

As the user keeps moving the slider 102 rightward, the drive controller 240 switches off the vibrating element 140 at time t16 and then the natural vibration of the top panel 120 is turned off. The user can obtain the tactile sensation as if the convexity exists on the top panel 120 through the fingertip. A period of time from time t15 to time t16 during which the drive signal of the vibrating element 140 is turned on is 100 ms, for example.

Since the period of time from time t15 to time t16 is a very short time such as 100 ms, the user feels the convexity and the concavity through the fingertip and can recognize that the fingertip has reached the second scale mark from the left end.

As the fingertip reaches the third scale mark at time t17, the travel distance of the fingertip reaches the designated distance D. Accordingly, the drive controller 240 switches on the vibrating element 140. Accordingly, the amplitude of the vibration of the top panel 120 rises up right after time t17. The user can obtain the tactile sensation as if the concavity exists on the top panel 120 through the fingertip.

As the user keeps moving the slider 102 rightward, the drive controller 240 switches off the vibrating element 140 at time t18 and then the natural vibration of the top panel 120 is turned off. The user can obtain the tactile sensation as if the convexity exists on the top panel 120 through the fingertip. A period of time from time t17 to time t18 during which the drive signal of the vibrating element 140 is turned on is 100 ms, for example.

Since the period of time from time t17 to time t18 is a very short time such as 100 ms, the user feels the convexity and the concavity through the fingertip and can recognize that the fingertip has reached the third scale mark from the left end.

As the user gets the fingertip off of the top panel 120 at time t19, the drive controller 240 finishes the control processes.

After that, the user does not touch the top panel 120. Accordingly, the amplitude of the vibration of the top panel 120 is zero and the top panel 120 remains without the vibration.

As described above, the drive control apparatus 300 can provide the tactile sensation of the convexity and the concavity to the user's fingertip every time the user moves the fingertip to the first, second and third scale marks from the left end of the slider 102.

Accordingly the user can obtain the tactile sensation as if the convexity and the concavity exist on the surface of the top panel 120 through the fingertip and recognize that the fingertip has reached each scale mark.

The driving pattern as illustrated in FIG. 12 includes the drive signal that rises up gradually at times t13, t15 and t17. This is different from the driving pattern which rises up sharply in a rectangular fashion at times t1, t4, t6 and t8 as illustrated in FIG. 11. The driving pattern may rise up sharply in a rectangular fashion as illustrated in FIG. 11 or rise up gradually as illustrated in FIG. 12. The gradual rising up of the driving pattern as illustrated in FIG. 12 may be realized by utilizing a drive signal that rises up in a sinusoidal waveform manner, for example.

Figure 13:
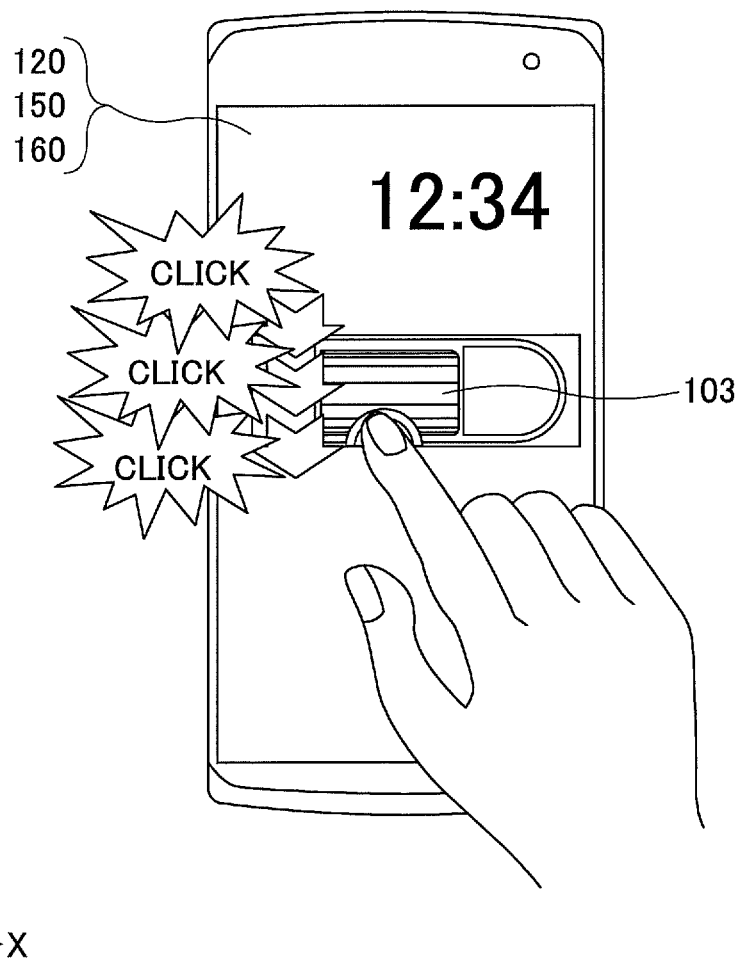
FIG. 13 is a diagram illustrating an example of an operating state of the electronic device 100 according to the first embodiment.

FIG. 13 illustrates an operation mode in which a dial 103 is used for controlling a designated level in a state where a designated application is running. The dial 103 is a GUI input part which accepts the manipulation input in a rotating manner. The user can adjust a level by rotating the dial 103 around a rotation axis parallel to X axis.

Before the user moves the dial 103, the natural vibration is generated on the top panel 120 while the user's fingertip is touching the top panel 120. The top panel 120 is in a slippery condition for the user's fingertip.

Herein, every time the dial 103 reaches the scale mark, the vibration of the top panel 120 is switched off so that the top panel 120 becomes in a non-slippery (grippy) condition for the user's fingertip. Accordingly, the tactile sensation as if the convexity exists on the surface of the top panel 120 is provided for the user. The vibrating element 140 is driven in accordance with the driving pattern which provides the tactile sensation as described above to the user. The tactile sensation as if the convexity exists on the surface of the top panel 120 provides a clicky sensation to the user.

Distances between two adjacent scale marks of the dial 103 are equal to each other. The designated distance D used at step S2 of the flow chart as illustrated in FIG. 8 is set to a distance of one section of the dial 103.

In such an operation mode, as the user drags the dial 103 from Y axis positive direction to Y axis negative direction and the slider 103 reaches the third scale mark, the drive controller 240 switches off the vibrating element 140 every time the dial 103 reaches the scale mark. When the drive controller 240 switches off the vibrating element 140, the natural vibration of the top panel 120 is switched off.

Accordingly, the drive control apparatus 300 can provide the tactile sensation of the convexity to the user's fingertip every time the user moves the fingertip to the first, second and third scale marks of the dial 103.

Figure 14:
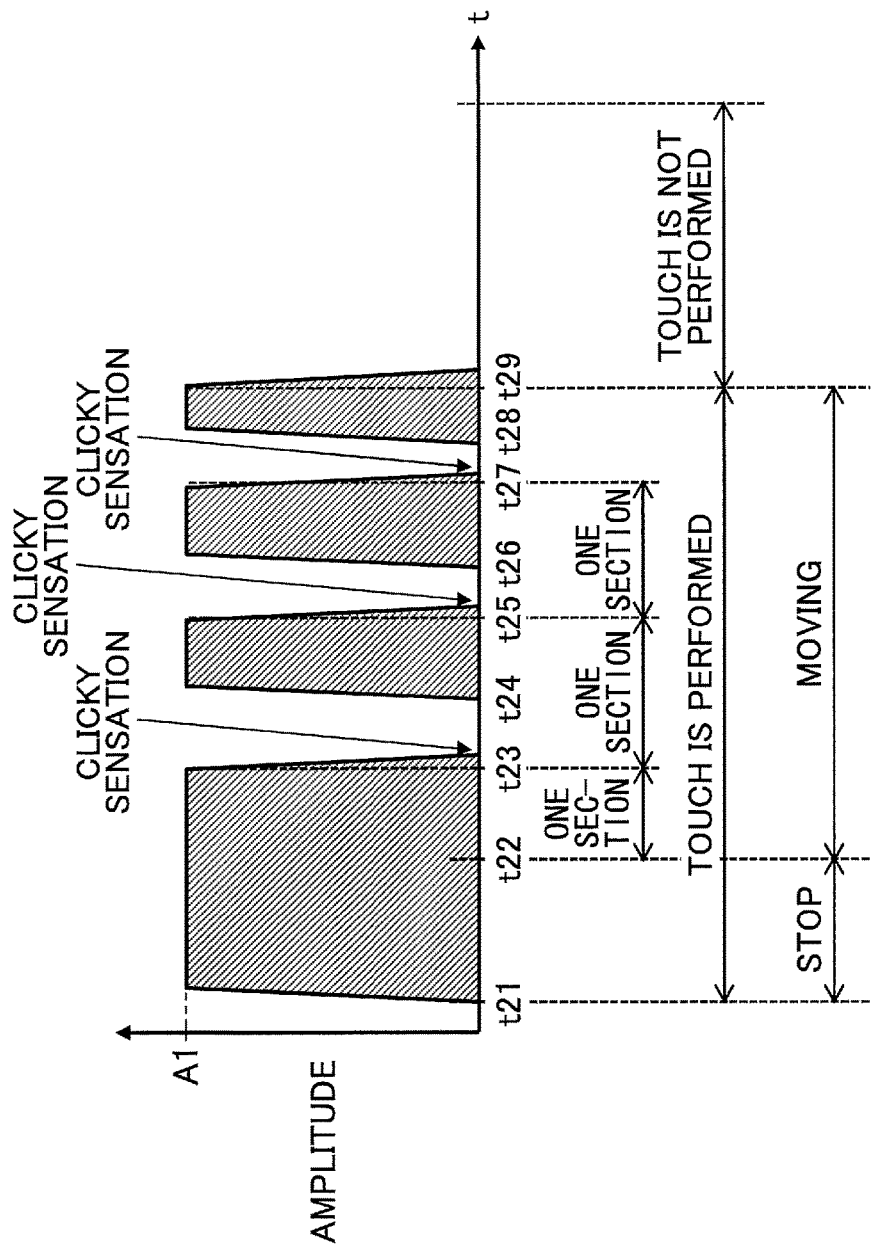
FIG. 14 is a diagram illustrating an example of an operating state of the electronic device according to the first embodiment.

Hereinafter, the driving pattern as described above will be described with reference to FIG. 14. In FIG. 14, the top panel 120 is vibrated at the natural vibration number of 33.5 kHz.

As illustrated in FIG. 14, when the user's fingertip touches the dial 103 at time 21, the drive controller 240 drives the vibrating element 140 and then the natural vibration is generated on the top panel 120. At time t21, the natural vibration having an amplitude A1 is generated on the top panel 120.

The user stops the fingertip from time t21 to time t22. Accordingly, the natural vibration having the amplitude A1 is generated on the top panel 120 from time t21 to time t22.

The user starts moving the fingertip at time t22. As the fingertip reaches the first scale mark of the dial 103 at time t23, the travel distance of the fingertip reaches the designated distance D. Therefore the drive controller 240 switches off the vibrating element 140. Accordingly, the amplitude of the vibration of the top panel 120 becomes zero right after time t23. The user can obtain the tactile sensation as if the convexity exists on the surface of the top panel 120 through the fingertip and recognize that the fingertip has reached the first scale mark of the dial 103.

As the user keeps moving the dial 103 in Y axis negative direction, the drive controller 240 drives the vibrating element 140 at time t24 and then the natural vibration having the amplitude A1 is generated on the top panel 120. A period of time from time t23 to time t24 during which the drive signal of the vibrating element 140 is turned off is 50 ms, for example.

As the fingertip reaches the second scale mark of the dial 103 at time t25, the travel distance of the fingertip reaches the designated distance D. Accordingly, the drive controller 240 switches off the vibrating element 140. Accordingly, the amplitude of the vibration of the top panel 120 becomes zero right after time t25. The user can obtain the tactile sensation as if the convexity exists on the surface of the top panel 120 through the fingertip and recognize that the fingertip has reached the second scale mark of the dial 103.

As the user keeps moving the dial 103 in Y axis negative direction, the drive controller 240 drives the vibrating element 140 at time t26 and then the natural vibration having the amplitude A1 is generated on the top panel 120. A period of time from time t25 to time t26 during which the drive signal of the vibrating element 140 is turned off is 50 ms, for example.

As the fingertip reaches the third scale mark of the dial 103 at time t27, the travel distance of the fingertip reaches the designated distance D. Accordingly, the drive controller 240 switches off the vibrating element 140. Accordingly, the amplitude of the vibration of the top panel 120 becomes zero right after time t27. The user can obtain the tactile sensation as if the convexity exists on the surface of the top panel 120 through the fingertip and recognize that the fingertip has reached the third scale mark of the dial 103.

As the user keeps moving the dial 103 in Y axis negative direction, the drive controller 240 drives the vibrating element 140 at time t28 and then the natural vibration having the amplitude A1 is generated on the top panel 120. A period of time from time t27 to time t28 during which the drive signal of the vibrating element 140 is turned off is 50 ms, for example.

As the user gets the fingertip off of the top panel 120 at time t29, the drive controller 240 switches off the vibrating element 140. Accordingly, the amplitude of the vibration of the top panel 120 becomes zero right after time t29.

After that, the user does not touch the top panel 120. Accordingly, the amplitude of the vibration of the top panel 120 is zero and the top panel 120 remains without the vibration.

As described above, the drive control apparatus 300 can provide the tactile sensation of the convexity to the user's fingertip every time the user moves the fingertip to the first, second and third scale marks of the dial 103.

Accordingly the user can obtain the tactile sensation as if the convexity exists on the surface of the top panel 120 through the fingertip and recognize that the fingertip has reached each scale mark.

Figure 15:
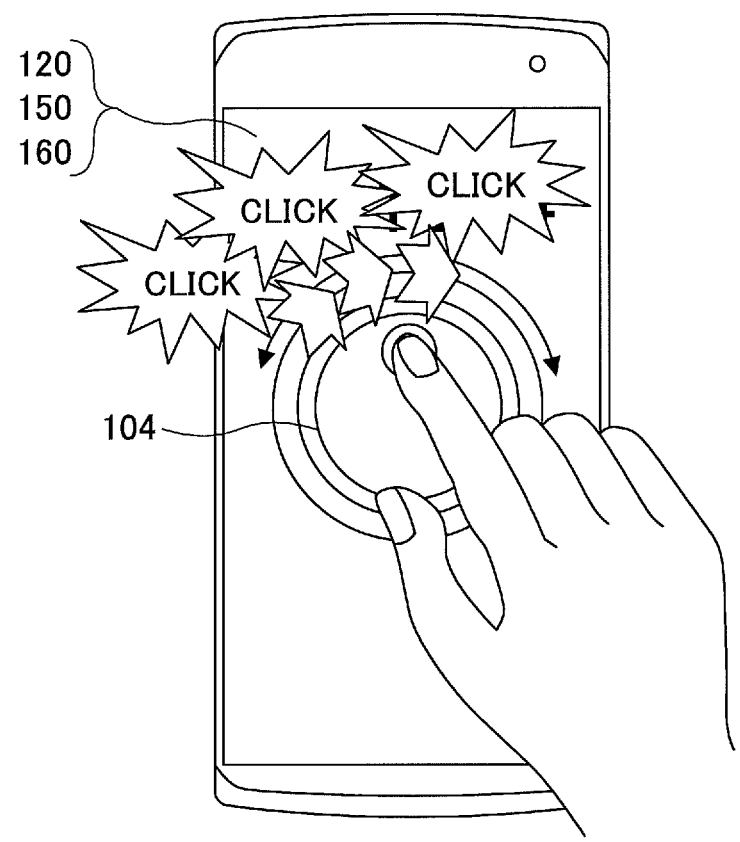
FIG. 15 is a diagram illustrating an example of an operating state of the electronic device according to the first embodiment.

FIG. 15 illustrates an operation mode in which a dial 104 is used for controlling a designated level in a state where a designated application is running. The dial 104 is a GUI input part which accepts the manipulation input in a rotating manner. The user can adjust a level by rotating the dial 104 around an axis parallel to Z axis.

Before the user moves the dial 104, the natural vibration is generated on the top panel 120 while the user's fingertip is touching the top panel 120. The top panel 120 is in a slippery condition for the user's fingertip.

Herein, every time the dial 104 reaches the scale mark, the vibration of the top panel 120 is switched off so that the top panel 120 becomes in a non-slippery (grippy) condition for the user's fingertip. Accordingly, the tactile sensation as if the convexity exists on the surface of the top panel 120 is provided for the user. The vibrating element 140 is driven in accordance with the driving pattern which provides the tactile sensation as described above to the user. The tactile sensation as if the convexity exists on the surface of the top panel 120 provides a clicky sensation to the user.

Distances between two adjacent scale marks of the dial 104 are equal to each other. The designated distance D used at step S2 of the flow chart as illustrated in FIG. 8 is set to a distance of one section of the dial 104.

In such an operation mode, as the user drags the dial 104 in a clockwise direction and the slider 104 reaches the third scale mark, the drive controller 240 switches off the vibrating element 140 every time dial 104 reaches the scale mark. When the drive controller 240 switches off the vibrating element 140, the natural vibration of the top panel 120 is switched off.

Accordingly, the drive control apparatus 300 can provide the tactile sensation of the convexity to the user's fingertip every time the user moves the fingertip to the first, second and third scale marks of the dial 104.

Figure 16:
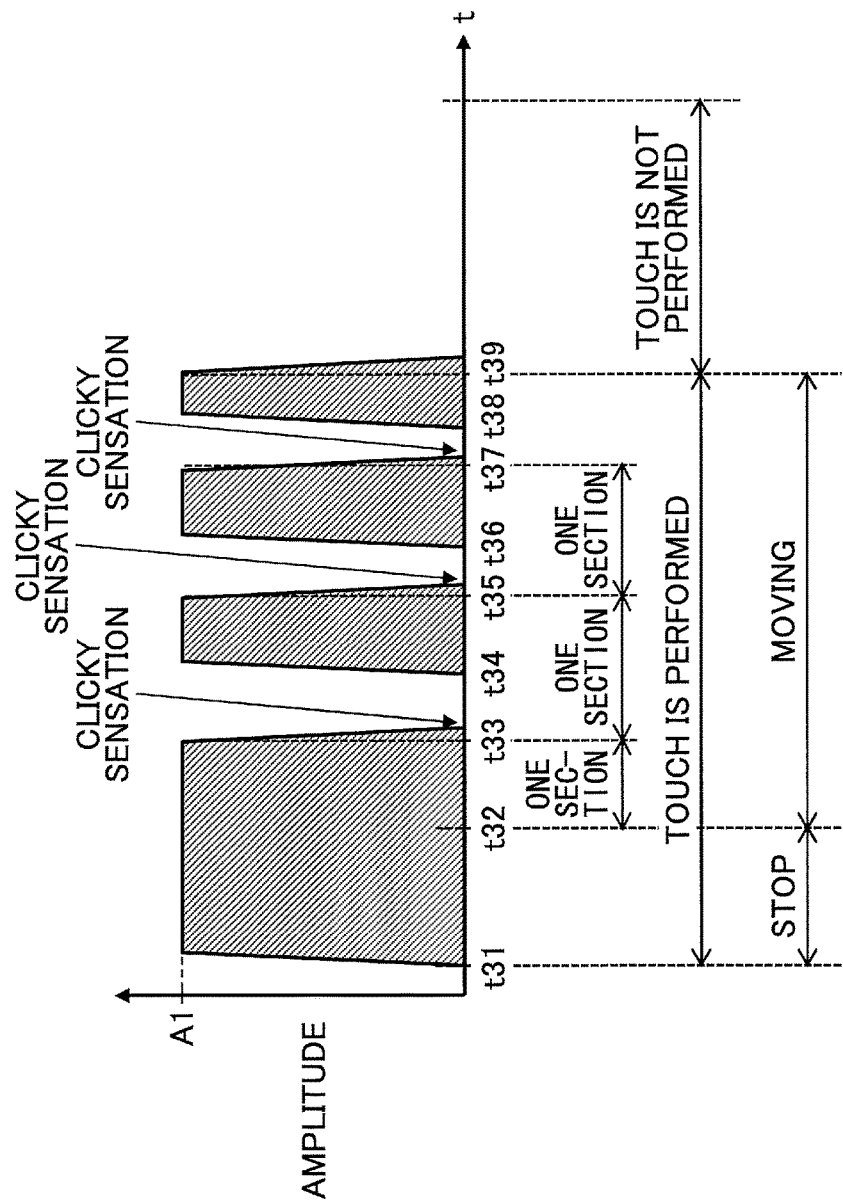
FIG. 16 is a diagram illustrating an example of an operating state of the electronic device according to the first embodiment.

Hereinafter, the driving pattern as described above will be described with reference to FIG. 16. In FIG. 16, the top panel 120 is vibrated at the natural vibration number of 33.5 kHz.

As illustrated in FIG. 16, when the user's fingertip touches the dial 104 at time t31, the drive controller 240 drives the vibrating element 140 and then the natural vibration is generated on the top panel 120. At time t31, the natural vibration having an amplitude A1 is generated on the top panel 120.

The user stops the fingertip from time t31 to time t32. Accordingly, the natural vibration having the amplitude A1 is generated on the top panel 120 from time t31 to time t32. The user starts moving the fingertip at time t32. As the fingertip reaches the first scale mark of the dial 104 at time t33, the travel distance of the fingertip reaches the designated distance D. Therefore the drive controller 240 switches off the vibrating element 140. Accordingly, the amplitude of the vibration of the top panel 120 becomes zero right after time t33. The user can obtain the tactile sensation as if the convexity exists on the surface of the top panel 120 through the fingertip and recognize that the fingertip has reached the first scale mark of the dial 104. The designated distance D is a circular distance obtained along a rotational direction of the dial 104.

As the user keeps moving the dial 103 in the clockwise direction, the drive controller 240 drives the vibrating element 140 at time t34 and then the natural vibration having the amplitude A1 is generated on the top panel 120. A period of time from time t33 to time t34 during which the drive signal of the vibrating element 140 is turned off is 50 ms, for example.

As the fingertip reaches the second scale mark of the dial 104 at time t35, the travel distance of the fingertip reaches the designated distance D. Accordingly, the drive controller 240 switches off the vibrating element 140. Accordingly, the amplitude of the vibration of the top panel 120 becomes zero right after time t35. The user can obtain the tactile sensation as if the convexity exists on the surface of the top panel 120 through the fingertip and recognize that the fingertip has reached the second scale mark of the dial 104.

As the user keeps moving the dial 104 in the clockwise direction, the drive controller 240 drives the vibrating element 140 at time t36 and then the natural vibration having the amplitude A1 is generated on the top panel 120. A period of time from time t35 to time t36 during which the drive signal of the vibrating element 140 is turned off is 50 ms, for example.

As the fingertip reaches the third scale mark of the dial 104 at time t37, the travel distance of the fingertip reaches the designated distance D. Accordingly, the drive controller 240 switches off the vibrating element 140. Accordingly, the amplitude of the vibration of the top panel 120 becomes zero right after time t37. The user can obtain the tactile sensation as if the convexity exists on the surface of the top panel 120 through the fingertip and recognize that the fingertip has reached the third scale mark of the dial 104.

As the user keeps moving the dial 103 in the clockwise direction, the drive controller 240 drives the vibrating element 140 at time t38 and then the natural vibration having the amplitude A1 is generated on the top panel 120. A period of time from time t37 to time t38 during which the drive signal of the vibrating element 140 is turned off is 50 ms, for example.

As the user gets the fingertip off of the top panel 120 at time t39, the drive controller 240 switches off the vibrating element 140. Accordingly, the amplitude of the vibration of the top panel 120 becomes zero right after time t39.

After that, the user does not touch the top panel 120. Accordingly, the amplitude of the vibration of the top panel 120 is zero and the top panel 120 remains without the vibration.

As described above, the drive control apparatus 300 can provide the tactile sensation of the convexity to the user's fingertip every time the user moves the fingertip in the clockwise direction to the first, second and third scale marks of the dial 104.

Accordingly the user can obtain the tactile sensation as if the convexity exists on the surface of the top panel 120 through the fingertip and recognize that the fingertip has reached each scale mark.

Figure 17:
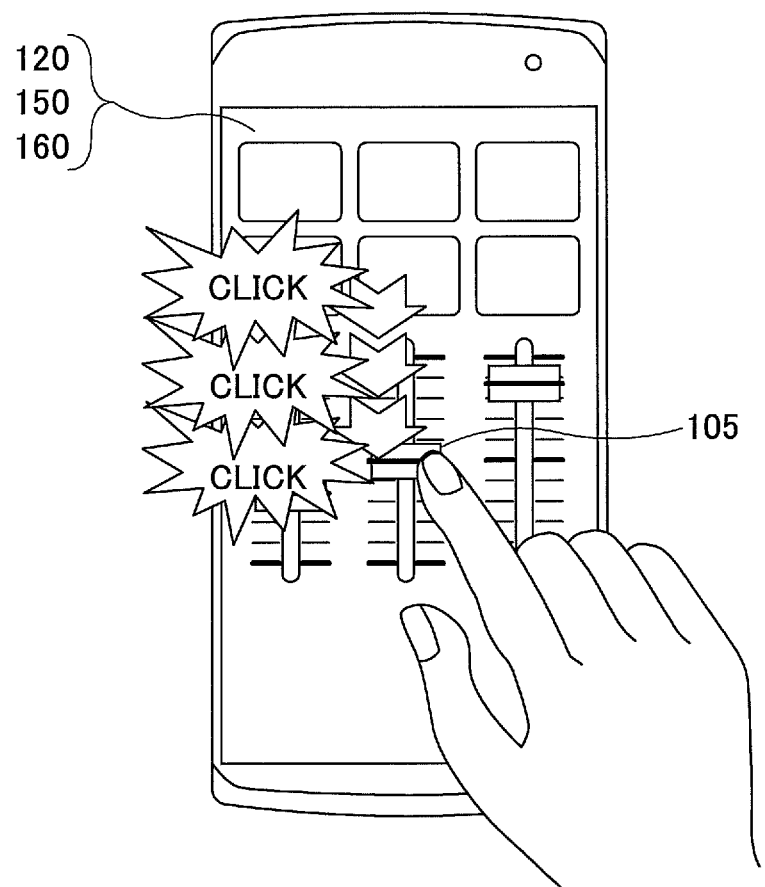
FIG. 17 is a diagram illustrating an example of an operating states of the electronic device according to the first embodiment.

FIG. 17 illustrates an operation mode in which a slider 105 is used for controlling a designated level in a state where a designated application is running. The slider 105 is a GUI input part which accepts the manipulation input in a sliding manner. The user can adjust a level by sliding the slider 105 in Y axis direction.

Distances between two adjacent scale marks of the slider 105 are equal to each other. The designated distance D used at step S2 of the flow chart as illustrated in FIG. 8 is set to a distance of one section of the slider 105.

In such an operation mode, as the user drags the slider 105 in Y axis direction and the slider 105 reaches each scale mark, the drive controller 240 switches on and off the vibrating element 140. When the drive controller 240 switches on and off the vibrating element 140, the natural vibration of the top panel 120 is switched on and off.

Accordingly, the drive control apparatus 300 can provide the tactile sensation of the convexity or the concavity to the user's fingertip every time the user moves the fingertip to the scale mark of the slider 105.

Although a slidable ON/OFF toggle switch is not illustrated, such a toggle switch can be operated in a manner similar to a slider having only one scale mark. Accordingly, it is possible to provide the tactile sensation of the convexity and the concavity to the user with regard to such a toggle switch.

Since the kinetic friction force applied to the user's fingertip is varied by generating the natural vibration at the ultrasound-frequency-band to the top panel 120, the electronic device 100 of the first embodiment can provide a fine or crispy tactile sensation (tactile sense) to the user.

The electronic device 100 of the embodiment generates the drive signal by causing the amplitude modulator 320 to modulate only the amplitude the sinusoidal wave at the ultrasound-frequency-band output from the sinusoidal wave generator 310. The frequency of the sinusoidal wave at the ultrasound-frequency-band generated by the sinusoidal wave generator 310 is equal to the natural vibration number of the top panel 120. The natural vibration number is determined in consideration of the weight of the vibrating element 140.

The drive signal is generated at the amplitude modulator 320 by modulating only the amplitude of the sinusoidal wave at the ultrasound-frequency-band generated by the sinusoidal wave generator 310 without modulating the frequency or the phase of the sinusoidal wave.

Accordingly, it becomes possible to generate the natural vibration of the top panel 120 at the ultrasound-frequency-band to the top panel 120 and to reduce the kinetic friction coefficient applied to the fingertip tracing the top panel 120 with absolute accuracy by utilizing the layer of air provided by the squeeze effect. It becomes possible to provide the fine or crispy tactile sensation as if there are the concavity and the convexity on the surface of the top panel 120 by utilizing the Sticky-band Illusion effect or the Fishbone Tactile Illusion effect to the user.

In the embodiment as described above, for the sake of providing the tactile sensation as if the concavity or the convexity is existing on the top panel 120 to the user, the vibrating element 140 is switched on or off. Turning off the vibrating element 140 is equal to setting the amplitude value represented by the drive signal used for driving the vibrating element 140 to zero.

However, it is not necessary to turn off the vibrating element 140 from a being turned on state. For example, instead of switching off the vibrating element 140, the amplitude of the vibration is reduced to a small level. For example, the electronic device 100 may provide the sense as if the concavity or the convexity is existed on the surface of the top panel 120 by reducing the amplitude to about one-fifth of that of the turned on state.

In this case, the vibrating element 140 is driven by the drive signal in a manner that the vibration of the vibrating element 140 is switched between a strong level and a weak level. As a result, the strength of the natural vibration generated to the top panel 120 is switched between the strong level and the weak level. It becomes possible to provide the tactile sensation as if the concavity or the convexity is existed on the surface of the top panel 120 through the user's fingertip.

If the electronic device 100 switches off the vibrating element 140 when making the vibration weaker in order to switch the vibration of the vibrating element 140 from the strong level to the weak level, the vibrating element 140 is switched off. Switching on and off the vibrating element 140 means driving the vibrating element 140 intermittently.

Switching the natural vibration between the strong level and the weak level in a manner as described above can be realized by varying the amplitude of the drive signal used for driving the vibrating element 140, for example. The greater the amplitude of the drive signal becomes, the greater the intensity of the natural vibration becomes. The smaller the amplitude of the drive signal becomes, the smaller the intensity of the natural vibration becomes. Instead of controlling the amplitude of the drive signal, a duty ratio of the drive signal may be controlled. In addition to controlling the amplitude of the drive signal, a duty ratio of the drive signal may be controlled.

Second Embodiment

In the second embodiment, a drive control method of the drive control apparatus 300 is modified compared with that of the first embodiment. In the second embodiment, FIG. 6 is incorporated.

Figure 19:
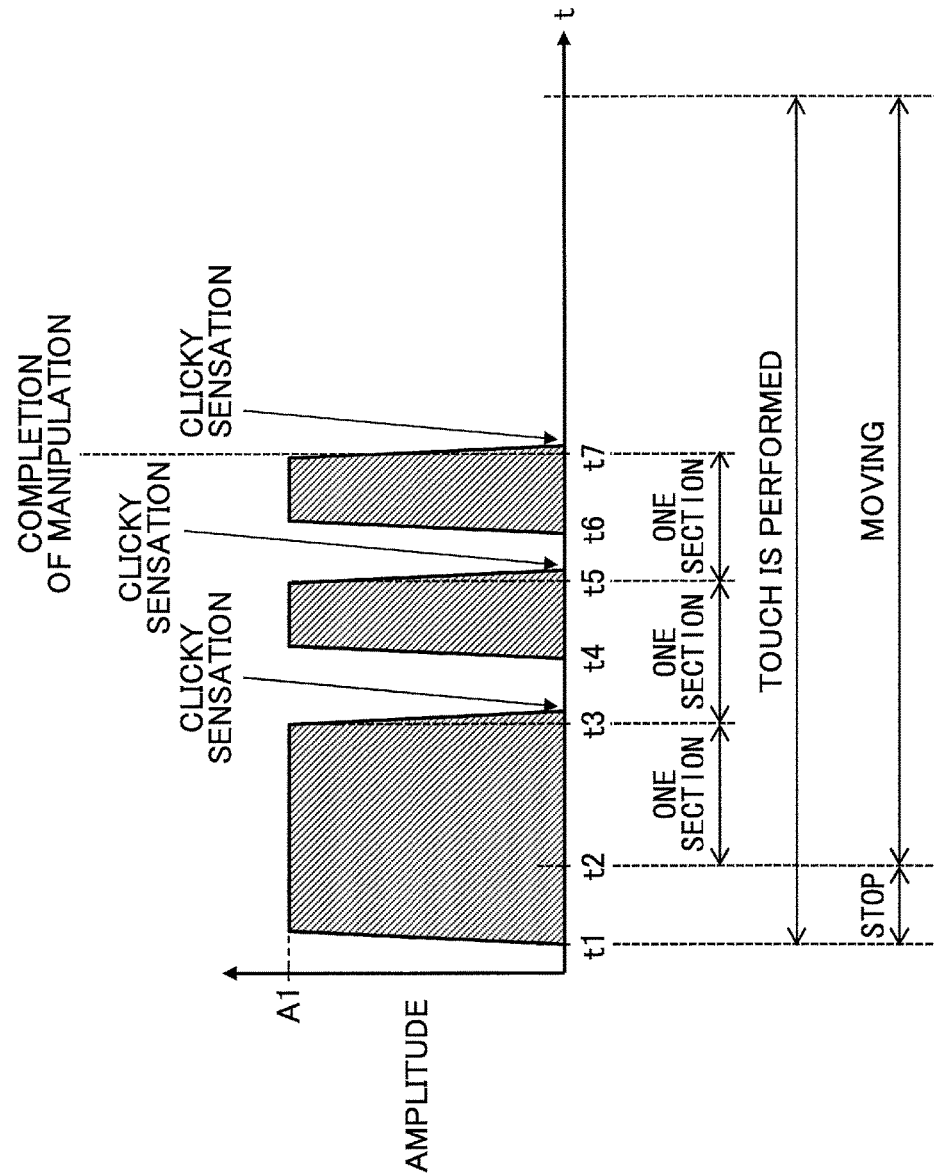
FIG. 19 is a diagram illustrating an example of an operating state of the drive control apparatus according to second embodiment.

FIGS. 18 and 19 are diagrams illustrating the examples of the operating states of the drive control apparatus 300 according to second embodiment.

FIG. 18 illustrates an operation mode in which a slider 102 is used for controlling a designated level in a state where a designated application is running. The user can control five levels with the slider 102. The slider 102 has five scale marks 102-1, 102-2, 102-3, 102-4 and 102-5.

In FIG. 18, the scale mark 102-1 indicates a starting position of manipulating the slider 102. The scale mark 102-4 indicates a finishing position of manipulating the slider 102. Herein, the scale mark 102-5 is not used in particular. The way how to use the scale marks 102-1 to 102-5 is different from that of the five scale marks as illustrated in FIG. 10.

For example, the slider 102 is a switch which is operated from left to right. If the travel distance reaches the fourth scale mark 102-4, the manipulation input performed to the slider 102 is completed. It is necessary to manipulate the slider 102 for three sections so that the slider 102 reaches the scale mark 102-4 from the scale mark 102-1.

Similar to the case as described with reference to FIG. 10, before the user moves the slider 102, the natural vibration is generated on the top panel 120 while the user's fingertip is touching the top panel 120. The top panel 120 is in a slippery condition for the user's fingertip.

Herein, every time the slider 102 reaches any one of the scale marks 102-2, 102-3 and 102-4, the vibration of the top panel 120 is switched off so that the top panel 120 becomes in a non-slippery (grippy) condition for the user's fingertip. Accordingly, the tactile sensation as if the convexity exists on the surface of the top panel 120 is provided for the user. The vibrating element 140 is driven in accordance with the driving pattern which provides the tactile sensation as described above to the user. The tactile sensation as if the convexity exists on the surface of the top panel 120 provides a clicky sensation to the user.

As the user's fingertip reaches the scale marks 102-2, 102-3 and 102-4, the user obtains the tactile sensation as if the convexity exists on the surface of the top panel 120.

FIG. 18 illustrates the operation mode in which the clicky sensations are provided to the user's fingertip before the travel distance reaches the complete position, and the kinetic friction force applied to the fingertip increases after the travel distance reaches the complete position. Accordingly, glippy sensations are provided to the user's fingertip after the travel distance reaches the complete position.

According to the second embodiment, when the user's fingertip reaches the scale mark 102-4 at which the manipulation is completed, the vibrating element 140 is kept in a off-state. Even if the fingertip moves beyond the scale mark 102-4 to a right side, the top panel 120 remains without the vibration.

Accordingly, as the user manipulates the slider 102 and the user's fingertip reaches the scale mark 102-4, the user obtains the tactile sensation as if the convexity exists on the surface of the top panel 120. When the user moves their fingertip beyond the scale mark 102-4 to the right side, the top panel 120 remains without the vibration. Accordingly, the user senses the increased kinetic friction force applied to the fingertip and recognizes the completion of the manipulation.

As a result, the user can recognize the completion of manipulating the slider 102 only through the tactile sensation.

Hereinafter, the driving pattern as described above will be described with reference to FIG. 19. In FIG. 19, the top panel 120 is vibrated at the natural vibration number of 33.5 kHz.

An operation mode from time t1 to time t7 is similar to that as illustrated in FIG. 11. Herein, an operation performed after time t7 is described.

As the fingertip reaches the scale mark 102-4 from the left at time t7, the travel distance of the fingertip reaches the designated distance D. Accordingly, the drive controller 240 switches off the vibrating element 140. Accordingly, the amplitude of the vibration of the top panel 120 becomes zero right after time t27. Accordingly the user can obtain the tactile sensation as if the convexity exists on the surface of the top panel 120 through the fingertip and recognize that the fingertip has reached the scale mark 102-4.

When the user moves their fingertip beyond the scale mark 102-4 to the right side, the top panel 120 remains without the vibration. Accordingly, the user senses the increased kinetic friction force applied to the fingertip and recognizes the completion of the manipulation.

As a result, the increased kinetic friction force is applied to the user's fingertip. In this state, the decrease of the kinetic friction force caused by the natural vibration of the top panel 120 does not occur.

Accordingly, the user can sense the completion of the manipulation only through the tactile sensation.

As described above, the drive control apparatus 300 can provide the tactile sensation of the convexity to the user's fingertip every time the user moves the fingertip to the scale marks 102-2, 102-3 and 102-4 of the slider 102.

After the user moves their fingertip beyond the scale mark 102-4 to the right side, the drive control apparatus 300 of the second embodiment kept the vibration in the off-state, the user can sense the increased kinetic friction force applied to the fingertip and recognize the completion of the manipulation.

According to the second embodiment, it is possible to provide the fine or crispy tactile sensation (tactile sense) to the user and to make the user recognize the completion of the manipulation through the fine or crisp tactile sensation.

According to the second embodiment, it becomes possible to generate the natural vibration of the top panel 120 at the ultrasound-frequency-band to the top panel 120 and to reduce the kinetic friction coefficient applied to the fingertip tracing the top panel 120 with absolute accuracy by utilizing the layer of air provided by the squeeze effect. It becomes possible to provide the fine or crispy tactile sensation as if there are the concavity and the convexity on the surface of the top panel 120 by utilizing the Sticky-band Illusion effect or the Fishbone Tactile Illusion effect to the user.

After the user moves their fingertip to the point at which the manipulation is completed, the top panel 120 remains in the off-state. Accordingly, the user can sense the increased kinetic friction force applied to the fingertip and recognize the completion of the manipulation through the fingertip.

According to the embodiment as described above, the ON/OFF state of the vibrating element 140 is switched. Instead of switching off the vibrating element 140, the amplitude of the vibration is reduced to a small level.

In the following, processes executed by the drive control apparatus 300 according to the second embodiment are described with reference to FIG. 20.

Figure 20:
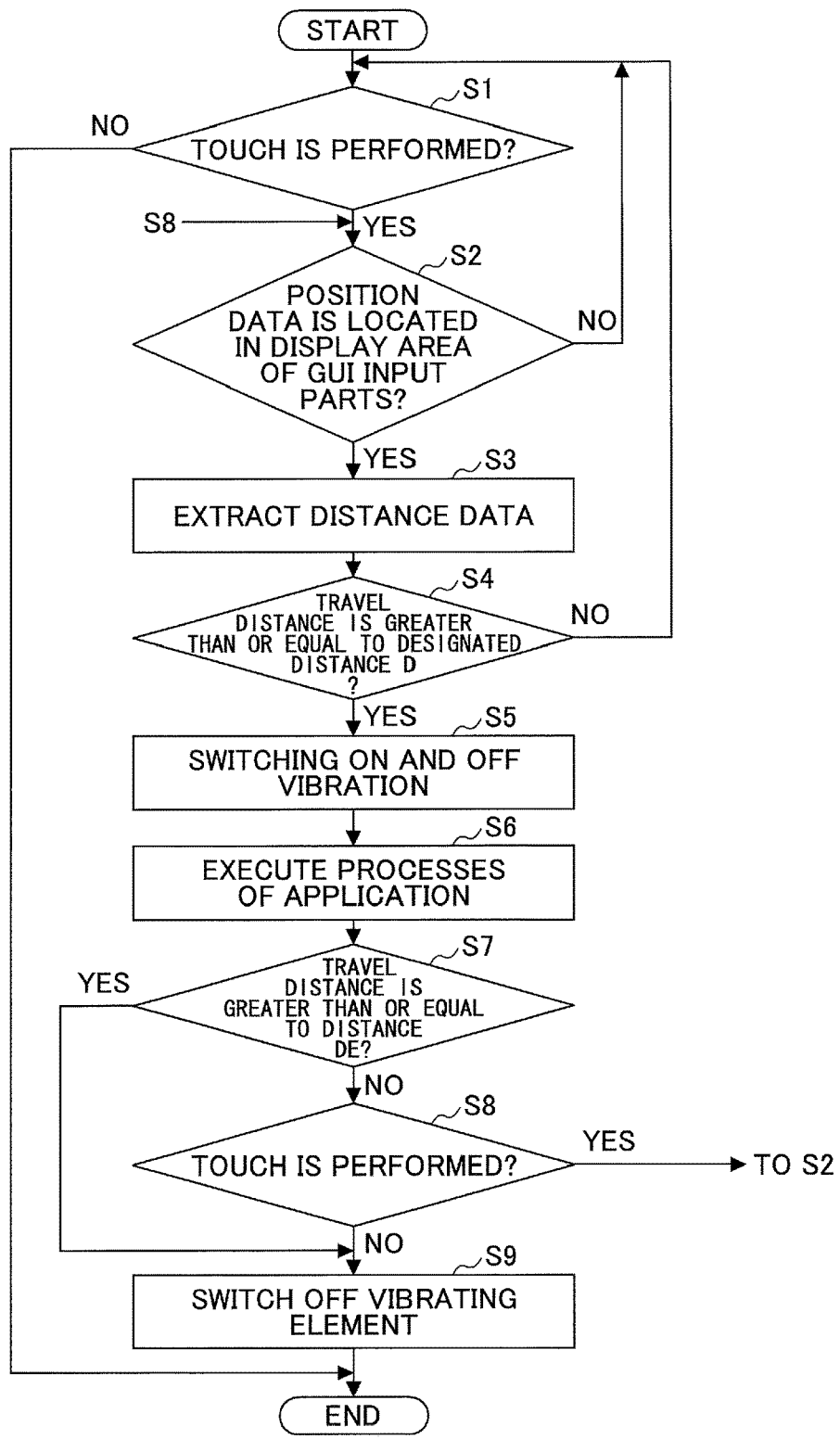
FIG. 20 is a diagram illustrating a flowchart executed by a drive controller of the drive control apparatus according to the second embodiment.

FIG. 20 is a diagram illustrating a flowchart executed by the drive controller 240 of the drive control apparatus 300 according to the second embodiment.

Steps S1 to S6 as illustrated in FIG. 20 are similar to that as illustrated in FIG. 8. Herein, processes executed after step S6 are described.

Upon finishing step S6, the drive controller 240 determines whether the travel distance is greater than or equal to a distance DE (step S7). The distance DE is equal to a distance between the scale marks 102-1 and 102-4 as illustrated in FIG. 18. This is for the sake of determining whether the manipulation is finished.

If the drive controller 240 determines that the travel distance is greater than or equal to the distance DE (87: YES), the drive controller 240 goes to step S9 and switches off the vibrating element 140 (step S9). As a result, the vibration of the top panel 120 is kept in the off-state, the user can sense the increased kinetic friction force applied to the fingertip and recognize the completion of the manipulation.

Upon finishing step S9, the drive controller 240 finishes the processes (END).

At step S7, if the drive controller 240 determines that the travel distance is less than the distance DE (S7: NO), the drive controller 240 determines whether the touch is performed (step S8). Presence or absence of the touch is determined based on whether the position data is input to the drive controller 240 from the driver IC 151 (see FIG. 6).

If the drive controller 240 determines at step S8 that the touch is performed (S1: YES), the drive controller 240 returns the flow to step S2.

If the drive controller 240 determines at step S8 that the touch is not performed (S8: NO), the drive controller 240 goes to step S9 and switches off the vibrating element 140. This is because the manipulation input is not performed.

The control processes as illustrated in FIG. 20 are repeatedly performed at every control cycle. Every time the travel distance reaches the unit travel distance while the user is moving the fingertip touching the GUI input parts or the like, the vibration of the top panel 120 is switched on and off. Therefore, it is possible to provide the tactile sensation of the convexity or the concavity to the user's fingertip and to make the user recognize that the travel distance reaches the unit travel distance through the tactile sensation.

Every time the travel distance reaches the unit travel distance, the processes of the application are executed.

Further, in a case where the travel distance reaches the distance DE, the vibration of the top panel 120 is kept in the off-state. Accordingly, the user can sense the increased kinetic friction force applied to the fingertip and recognize the completion of the manipulation.

If the user gets the fingertip off of the top panel 120, the drive control part 240 finishes all of the processes.

According to the embodiment as described above, if the travel distance is less than the distance DE, the vibration of the top panel 120 is switched off every time the fingertip reaches the scale mark 102-2 or 102-3. Further, if the travel distance is greater than or equal to the distance DE, the vibration of the top panel 120 is kept in the off-state.

This is one example in which the vibrating element 140 is driven by a first driving pattern in a case where the travel distance is less than the distance DE and the vibrating element 140 is driven by a second driving pattern in a case where the travel distance is greater than or equal to the distance DE.

According to the first driving pattern, the drive controller 240 switches on and off the vibrating element 140 in response to the drive signal that generates the natural vibration having the amplitude A1 on the top panel 120. Accordingly, the amplitude of the natural vibration generated on the top panel 120 is switched between a strong level providing the amplitude A1 and a weak level making the amplitude zero.

The second driving pattern sets a switching degree of the intensity of the natural vibration of the top panel 120 to zero and sets the intensity of the natural vibration to zero.

Herein, the first driving pattern and the second driving pattern may be varied as long as they are different to each other. The reason is as follows. If the drive controller 240 switches the driving pattern when the travel distance becomes greater than or equal to the distance DE, the user can recognize the completion of the manipulation only through the tactile sensation.

As described above, according to the second driving pattern, the switching degree of the intensity of the natural vibration of the top panel 120 may be set to zero and the intensity of the natural vibration is set to zero. Instead of setting the intensity of the natural vibration of the second driving pattern to zero, the intensity of the natural vibration of the second driving pattern may be set to a smaller level than that of the natural vibration of the first driving pattern. The reason is as follows. As the intensity of the natural vibration becomes smaller, the user can recognize the completion of the manipulation only through the tactile sensation.

The intensity of the natural vibration of the top panel 120 of the second driving pattern may be greater than that of the first driving pattern. For example, the amplitude of the natural vibration of the second driving pattern may be greater than that of the first driving pattern.

According to the embodiment as described above, the natural vibration of the top panel 120 is kept in the off-state when the position of the manipulation input reaches the scale mark 102-4 at which the manipulation of the slider 102 is completed and further moves beyond the scale mark 102-4.

However, the natural vibration of the top panel 120 may be switched off before completing the manipulation of the slider 102. In other words, the drive controller 240 may switch the driving pattern from the first driving pattern to the second driving pattern before the manipulation of the slider 102 is completed.

For example, the drive controller 240 may switch off the natural vibration of the top panel 120 when the position of the manipulation input reaches the scale mark 102-3 and further moves beyond the scale mark 102-3. In this case, it is possible to inform the user that the completion of the manipulation is approaching only through the tactile sensation.

As described above, the drive controller 240 may switch the driving pattern from the first driving pattern to the second driving pattern when the travel distance reaches a designated degree at which the manipulation is completed.

The drive controller 240 may switch the driving pattern in response to an increase of the travel distance before the travel distance reaches a designated distance which is necessary for completing the manipulation. For example, when the drive controller 240 is driving the vibrating element 140 in response to the first driving pattern, the drive controller 240 may switch the intensity of the natural vibration as the travel distance approaches the designated distance which is necessary for completing the manipulation.

Further, when the drive controller 240 is driving the vibrating element 140 in response to the first driving pattern, the drive controller 240 may increase or decrease the amplitude of the natural vibration as the travel distance approaches the designated distance which is necessary for completing the manipulation. In this case, the first driving pattern may be set so that the user can recognize the switching of the driving pattern from the first driving pattern to the second driving pattern only through the tactile sensation.

Figure 21:
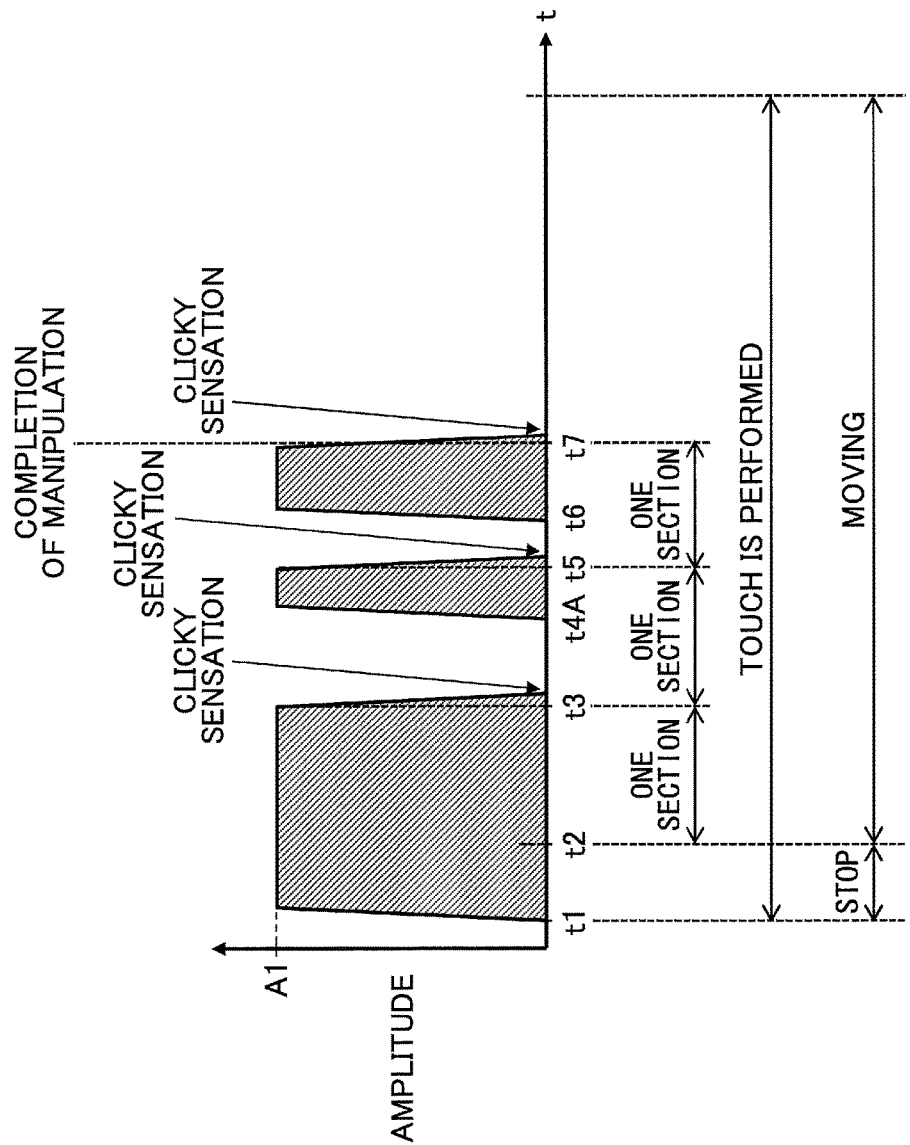
FIG. 21 is a diagram illustrating an example of an operating state of the drive control apparatus according to a variational embodiment.

FIG. 21 is a diagram illustrating an example of the operating state of the drive control apparatus 300 according to a variational embodiment. The operating state as illustrated in FIG. 21 is a variation of the operating state as illustrated in FIG. 19.

For example, as illustrated in FIG. 21, after the user's fingertip (the position of the manipulation input) reaches the scale mark 102-2 at time t3, the drive controller 240 may keep the vibrating element 140 in the off-state until time t4A later than time t4 as illustrated in FIG. 19 and switch on the vibrating element 140 at time t4A.

The operating state as illustrated in FIG. 21 is modified by delaying the timing at which the vibration of the top panel 120 is switched on again after the position of the manipulation input has reached at the scale mark 102-2 compared with the operating state as illustrated in FIG. 19. In other words, according to the operating state as illustrated in FIG. 21, a period of time during which the drive signal of the vibrating element 140 is kept to the off-state after the position of the manipulation input has reached the scale mark 102-2 is made longer than a period of time during which the drive signal of the vibrating element 140 is kept to the off-state after the position of the manipulation input has reached the scale mark 102-3. The position of the manipulation input reaches the scale mark 102-3 at time t5.

For example, in a case where the period of time during which the drive signal of the vibrating element 140 is kept to the off-state after the position of the manipulation input has reached the scale mark 102-3 is 50 ms, the period of time during which the drive signal of the vibrating element 140 is kept to the off-state after the position of the manipulation input has reached the scale mark 102-2 may be set to 100 ms.

As described above, before the travel distance reaches the designated distance which is necessary for completing the manipulation, the drive controller 240 may switch the driving pattern in response to an increase of the travel distance. Accordingly, the user can recognize that the completion of the manipulation is approaching only through the tactile sensation.

According to the driving pattern such as described above, it becomes easier for the user to sense the tactile sensation by varying the period of the during which the drive signal of the vibrating element 140 is kept in the off-state, particularly in a case where there is a large number of the scale marks.

On the contrary, in a case where the period of time during which the drive signal of the vibrating element 140 is kept to the off-state after the position of the manipulation input has reached the scale mark 102-2 is 50 ms, the period of time during which the drive signal of the vibrating element 140 is kept to the off-state after the position of the manipulation input has reached the scale mark 102-3 may be set to 100 ms.

Third Embodiment

Figure 22:
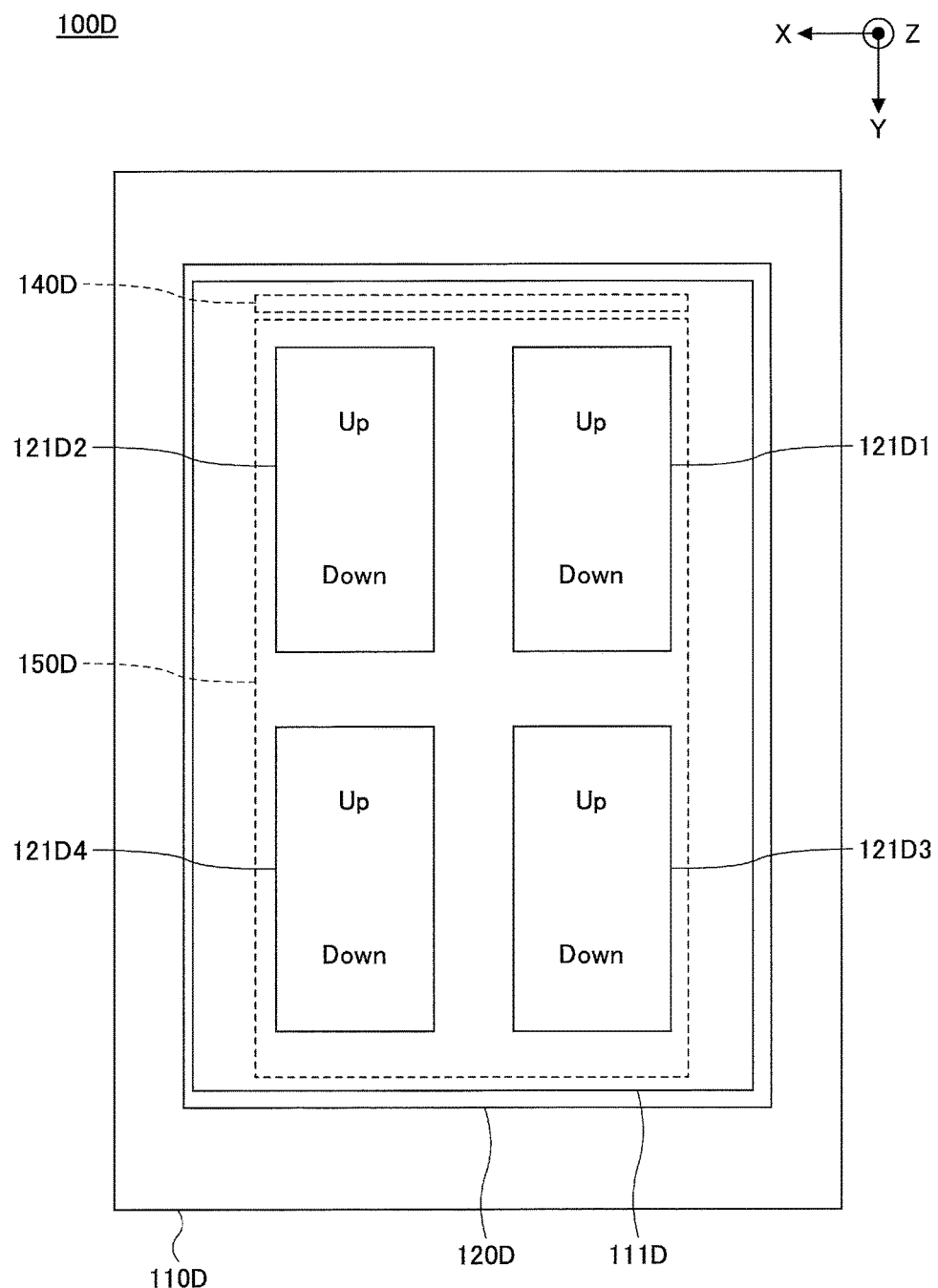
FIG. 22 is a diagram illustrating an electronic device according to a third embodiment in plan view.

FIG. 22 is a diagram illustrating an electronic device 100 according to the third embodiment in plan view. In FIG. 22, inner configurations are illustrated in a transparent manner. The electronic device 100D according to the third embodiment is used as a window controller of a vehicle and placed at an inside panel of a door of the vehicle. More specifically, the electronic device 1000 is an input apparatus.

The electronic device 100D includes a housing 110D, a top panel 120D, a vibrating element 140D and a touch panel 150D. The housing 110D, the top panel 120D, the vibrating element 140D and the touch panel 150D are similar to the housing 110, the top panel 120, the vibrating element 140 and the touch panel 150 as illustrated in FIGS. 2 and 3, respectively. In FIG. 22, the double-faced adhesive tape 130 and the substrate 170 are omitted. The electronic device 100D does not include the display panel 160 (see FIG. 2).

A concavity 111D is formed in the housing 110D of the electronic device 100D as illustrated in FIG. 22. The concavity 111D has a rectangular shape in plan view and is formed in an entire portion of the housing 110D except for an outer portion in plan view in a manner similar to the concavity 111 of the housing 110 as illustrated in FIGS. 2 and 3.

The vibrating element 140D and the touch panel 150D are disposed in the concavity 111D. The vibrating element 140D is attached on a back surface of the top panel 120D at a location along a short side on a negative side in Y axis direction. The vibrating element 140D is provided along almost all over the short side. As illustrated in FIG. 22, the touch panel 150D is provided on a bottom surface of the concavity 111D at a location on a positive side in Y axis direction with respect to the vibrating element 140.

A width in X axis of the vibrating element 140D of the electronic device 100D according to the third embodiment is almost equal to that of the touch panel 150.

The reason why the vibrating element 140D has a configuration as described above is as follows. It is preferable for the vibrating element 140D to have almost the same width in X axis direction as that of the touch panel 150 in order to generate standing waves on the top panel 120D in a whole area in which the touch panel 150D is disposed.

A double-faced adhesive tape corresponding to the double-faced adhesive tape 130 as illustrated in FIGS. 2 and 3 is disposed in an area surrounding the concavity 111D along a peripheral portion of the top panel 120D in plan view. The double-faced adhesive tape adheres the housing 110D and the top panel 120D.

Operating portions 121D1, 121D2, 121D3 and 121D4 are disposed in an area in which the touch panel 150D is disposed. Outlines and characters indicating the operating portions 121D01, 121D2, 121D3 and 121D4 are printed on the back surface of the top panel 120D.

Area data representing positions of four areas in which the operating portions 12101, 121D2, 121D3 and 121D4 are printed, respectively, is provided in a manner similar to the area data f1 to f4 as illustrated in FIG. 7. The area data represents the positions of the four data in XY coordinate system. If the user performs the manipulation input in the operating portions 121D1, 121D2, 121D3 and 121D4, the drive controller 240 drives the vibrating element 140D in response to designated vibration patterns, respectively.

The designated vibration patterns may be associated with the area data of the four areas in which the operating portions 121D1, 121D2, 121D3 and 121D4 are printed and may be stored in memory 250 in a manner similar to the vibration patterns P1 to P4 associated with the area data f1 to f4 as illustrated in FIG. 7. Herein, the vibration patterns P1 to P4 may be equal to each other.

According the electronic device 100D of the third embodiment, the drive controller 240 may drive the vibrating element 140D in a case where the manipulation input is performed in an area other than the four areas in which the operating portions 121D01, 121D2, 121D3 and 121D4 are printed.

In this case, area data representing the area other than the four area and located in the area in which the touch panel 150D is disposed and data representing the vibration patterns may be associated with each other in a manner similar to that of the vibration patterns P1 to P4 and area data f1 to f4 included in the control data as illustrated in FIG. 7.

The operating portions 12101, 121D2, 121D3 and 121D4 are used for opening and closing a front right side window, a front left side window, a rear right side window and a rear left side window, respectively.

If the user performs the manipulation input on the surface of the top panel 120D in the four areas in which the operating portions 121D1, 121D2, 121D3 and 121D4 are printed, the touch panel 150D outputs the position data to an ECU 400. Accordingly, it is possible to open and close the front right side window, the front left side window, the rear right side window and the rear left side window.

The electronic device 100D as illustrated in FIG. 22 may switch the driving pattern from the first driving pattern to the second driving pattern when the travel distance of the user's manipulation input performed in the operating portion 121D1 reaches a designated point at which the manipulation is completed.

Figure 23:
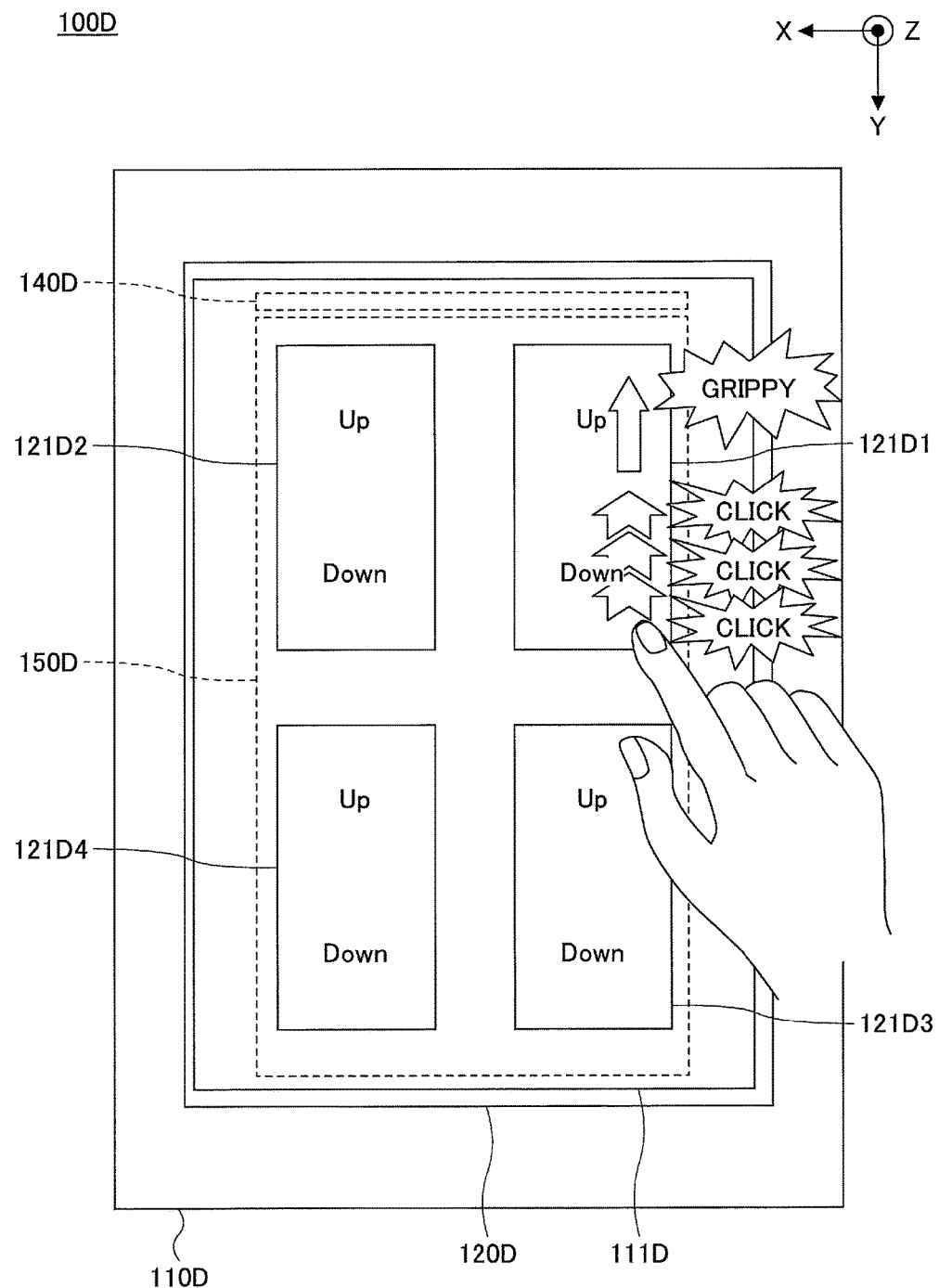
FIG. 23 is a diagram illustrating an operating state of an electronic device according to the third embodiment.

FIG. 23 is a diagram illustrating an operating state of an electronic device 100D according to the third embodiment. Before the travel distance reaches a distance at which the manipulation is completed while the user is performing the manipulation input in the operating portion 121D1, the fine or crispy tactile sensation is provided for the user's fingertip in a manner similar to that as illustrated in FIG. 18. When the travel distance reaches the distance at which the manipulation is completed, the user-senses the increased kinetic friction force applied to the fingertip and recognizes the completion of the manipulation. FIG. 23 illustrates the operating state in which the kinetic friction force applied to the fingertip is increased, and grippy sensations are provided to the user's fingertip.

For example, if the driving pattern is switched from first driving pattern to the second driving pattern when the user manipulates the operating portion 121D1 and opening or closing operation of the front right side window is completed, the user senses the increased kinetic friction force applied to their fingertip and recognizes the completion of the manipulation.

As a result, the user can recognize the completion of the opening or closing operation of the front right side window only through the tactile sensation. The user senses and recognizes in a similar way when the user manipulates the operating portion 121D2, 121D3 or 121D4 in order to open or close the front left side window, the rear right side window or the rear left side window.

As described above, the electronic device 100D of the third embodiment generates the natural vibration in the ultrasound-frequency-band on the top panel 120D and varies the kinetic friction force applied to the user's fingertip. Accordingly, the electronic device 100D can provide the fine or crisp sensation while the user is manipulating the operating portion 121D1, 121D2, 121D3 or 121D4.

The electronic device 100D of the third embodiment stops the vibration of the vibrating element 140 for a designated period of time at boundary portions of the operating portion 121D1, 121D2, 121D3 and 121D4. Accordingly, the user can recognize the positions of the operating portion 121D1, 121D2, 121D3 and 121D4 through the tactile sensation of the convexity. Thus the electronic device 100D has a highly enhanced convenience.

When the travel distance reaches the distance at which the manipulation is completed, the vibration of the top panel 120 is switched off. Accordingly, the user senses the increased kinetic friction force applied to the fingertip and recognizes the completion of the manipulation.

As a result, the increased kinetic friction force is applied to the user's fingertip. In this state, the decrease of the kinetic friction force caused by the natural vibration of the top panel 120 does not occur.

Accordingly, the user can sense the completion of the manipulation only through the tactile sensation.

Fourth Embodiment

Figure 24:
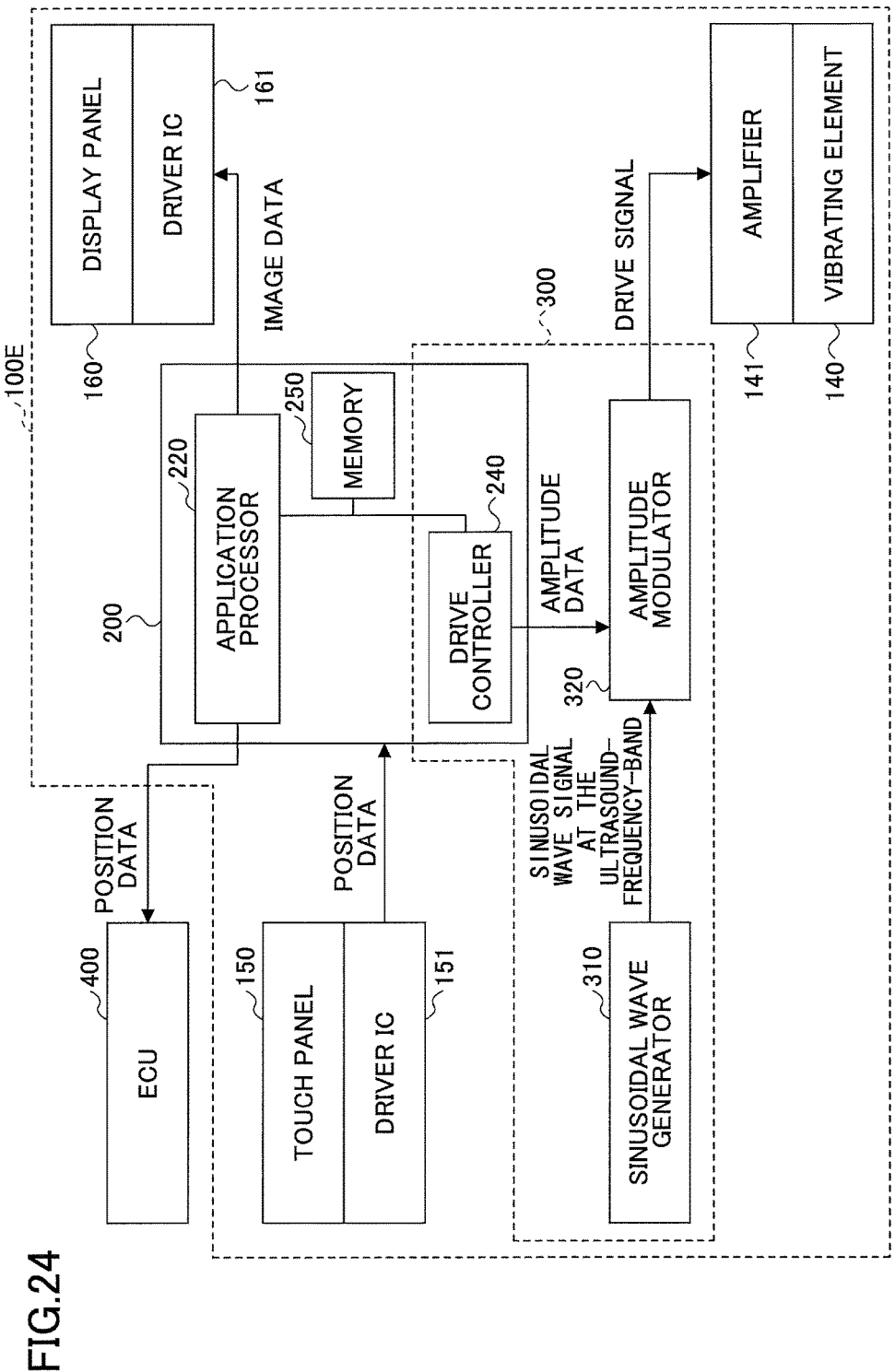
FIG. 24 is a diagram illustrating a configuration of an electronic device according to an embodiment.

FIG. 24 is a diagram illustrating the configuration of an electronic device 100E according to the embodiment.

The electronic device 100E includes a vibrating element 140, an amplifier 141, a touch panel 150, a driver IC 151, a display panel 160, a driver IC 161, a controller 200, a sinusoidal wave generator 310 and an amplitude modulator 320. The electronic device 100E is different from the electronic device 100 as illustrated in FIG. 6 in that the electronic device 100E does not include the communication processor 230. In the following, a description will be given mainly with respect to such differences.

An electronic control unit (ECU) 400 of a vehicle is connected to the electronic device 100E.

The application processor 220 outputs image data representing GUI input parts, images, characters, signs, figures and the like that are necessary for drive controls performed by the ECU 400. For example, in a case where the ECU 400 performs the drive control of a navigation device, an audio controller, an air conditioner controller, a power window controller, a mirror controller or the like, the application processor 220 outputs the image data representing the GUI input parts or the like to the driver IC 161.

The driver IC 151 outputs the position data to the application processor 220, and the application processor 220 outputs the position data to the ECU 400. Accordingly, the position data obtained based on the manipulation input performed onto the touch panel 150 is input to the ECU 400.

Herein, the position data may be input to the ECU 400 directly from the driver IC 151 without being transmitted through the application processor 220.

The drive control apparatus 100E of the fourth embodiment causes the top panel 120 to vibrate in order to vary the kinetic friction force applied to the user's fingertip when the fingertip traces along the surface of the top panel 120.

There are various manipulation inputs such as a flick operation, a swipe operation and a drag operation, for example, that the user performs when the user moves their fingertip along the surface of the top panel 120.

The flick operation is performed by flicking (snapping) the fingertip along the surface of the top panel 120 for a relatively-short distance. The swipe operation is performed by swiping the fingertip along the surface of the top panel 120 for a relatively-long distance. The drag operation is performed by dragging the fingertip along the surface of the top panel 120 while selecting a button or the like displayed on the display panel 160 when the user slides the button of the like.

The flick operation, the swipe operation and the drag operation are examples of the manipulation input. When the user performs the manipulation input by moving their fingertip along the surface of the top panel 120, the user performs any one of the flick operation, the swipe operation and the drag operation in accordance with the GUI input part of the like displayed on the display panel 160.

The ECU 400 is mounted on the vehicle and is a controller for controlling the navigation device, the audio controller, the air conditioner controller, the power window controller, the mirror controller of the like, for example. The position data detected based on the manipulation input performed onto the touch panel 150 of the electronic device 100E is input to the ECU 400 via the application processor 220.

The ECU 400 determines a content of the manipulation input based on the position data input via the application processor 220 and controls the navigation device, the audio controller, the air conditioner controller, the power window controller, the mirror controller or the like, for example.

Hereinafter, an embodiment in which the ECU 400 includes the power window controller will be described.

Figure 25:
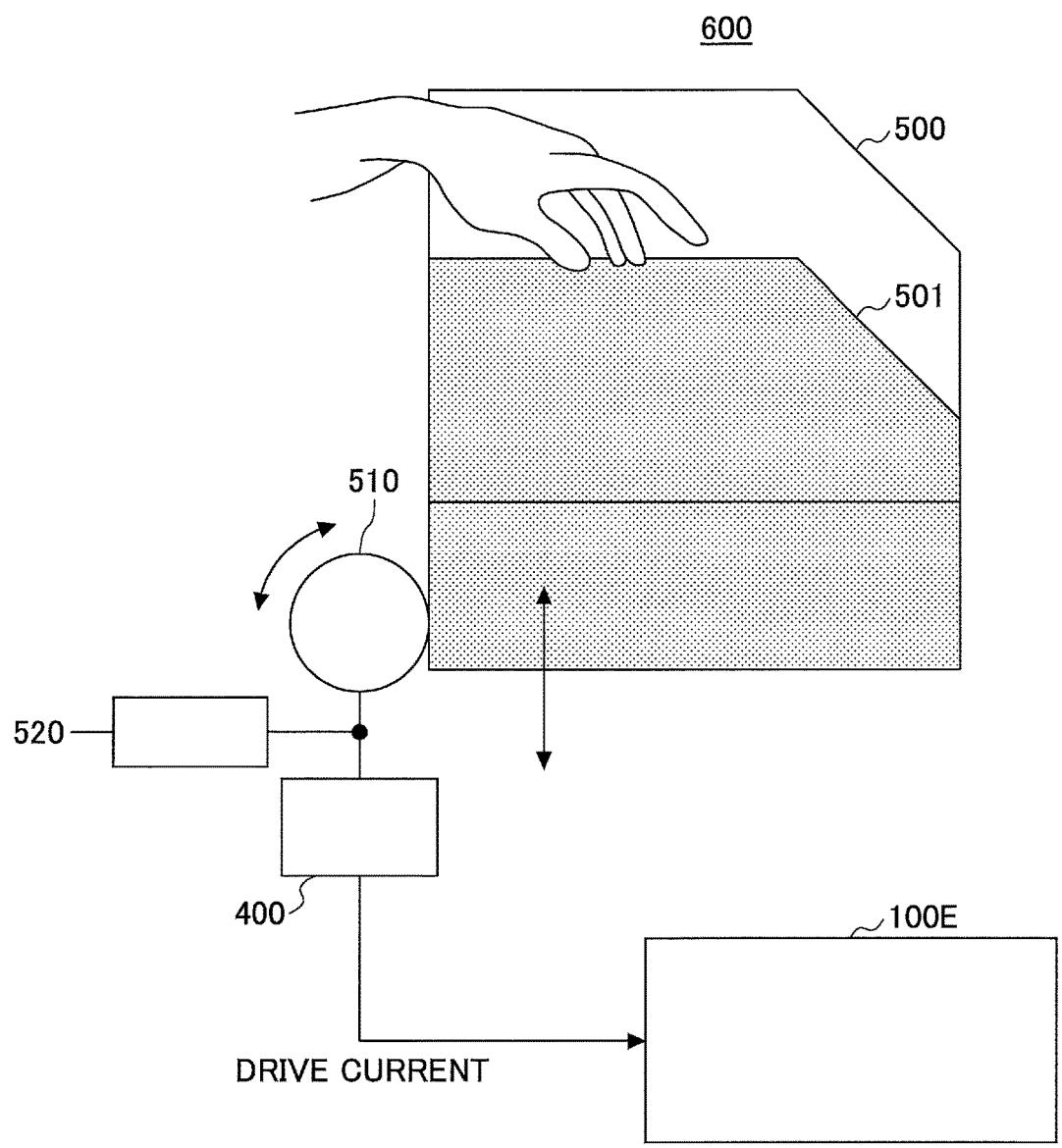
FIG. 25 is a diagram illustrating a part of a configuration of a vehicle which includes the electronic device of a fourth embodiment and an ECU.

FIG. 25 is a diagram illustrating a part of a configuration of a vehicle 600 which includes the electronic device 100E of the fourth embodiment and the ECU 400.

As illustrated in FIG. 25, the vehicle 600 includes the electronic device 100E, the ECU 400, a door frame 500, a window 501, a motor 510 and a current sensor 520.

The drive control apparatus of the fourth embodiment includes the drive control apparatus 300 as illustrated in FIG. 24 and the current sensor 520 as illustrated in FIG. 25.

The door frame 500 is one of a plurality of door frames of the vehicle 600 and holds the window 501. The window 501 is moved up and down by the motor 510. The opening and closing operation of an electric window is performed in a manner such as this. A window regulator and the like that moves up and down the window 501 is omitted.

The ECU 400 performs a drive control of the motor 510. The drive control of moving up and down the window 501 is performed by the ECU 400 based on the manipulation input performed onto electronic device 100E. The electronic device 100E includes operating portions 121D1, 121D2, 121D3 and 121D4 in a manner similar to the electronic device 100D as illustrated in FIGS. 22 and 23.

A memory 250 of the electronic device 100E stores data representing a minimum value of a drive current of the motor 510 when a hand or the like are get caught in the window 501. In a case where the hand or the like is get caught in the window 501, a load of the motor 510 increases and thus the drive current of the motor 510 increases. The drive current of the motor 510 is detected by the current sensor 520.

The electronic device 100E of the fourth embodiment stores the data representing the minimum value of the drive current in the memory 250. The minimum value is used as a threshold value used for determining whether the hand or the like is get caught in the window 501. The minimum value is used for the sake of stopping the motor 510 in a case where the hand or the like is get caught in the window 501. If the drive current becomes greater than or equal to the threshold value, the electronic device 100E determines that the hand or the like is get caught in the window 501 and causes the ECU 400 to stop the motor 510.

Figure 26:
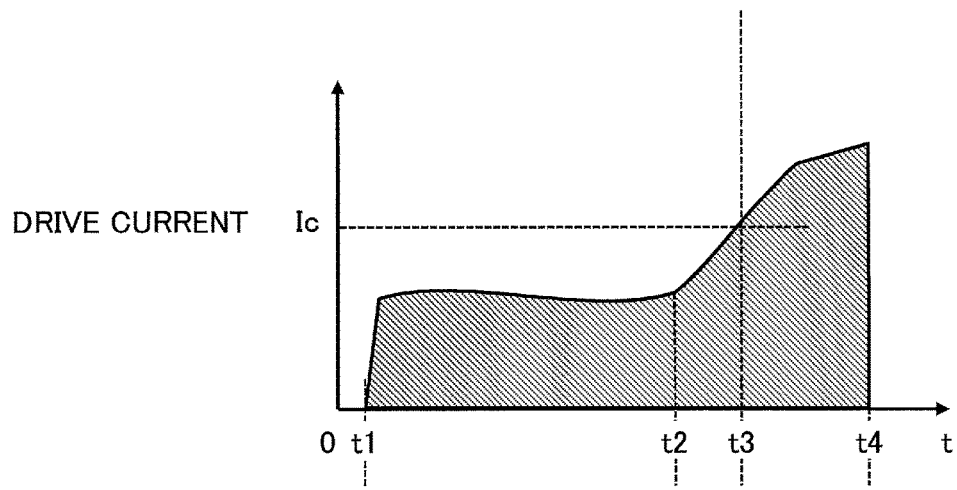
FIG. 26 is a diagram illustrating an operating state of an electronic device according to the fourth embodiment.

FIG. 26 is a diagram illustrating an operating state of an electronic device 100E according to the fourth embodiment. In FIG. 26, a horizontal axis represents time and a vertical axis represents the drive current of the motor 510 detected by the current sensor 520. In FIG. 26, the minimum value used as the threshold is indicated as a current Ic.

At time t1, when the manipulation input is performed onto the electronic device 100E by the user in order to close the window 501, the ECU 400 drives the motor 510. Accordingly, the window 501 is moved up. This state lasts until time t2.

At time t2, the drive current begins to increase gradually. This indicates that the hand or the like is get caught in the window 501 and the load of the motor 510 is increasing.

At time t3, when the drive current becomes greater than or equal to the current Ic, the electronic device 100E stops driving of the vibrating element 140.

As a result, the vibration of the top panel 120 is switched off and then the user senses the increased kinetic friction force applied to their fingertip and recognizes the hand or the like is get caught in the window 501.

As a result, the increased kinetic friction force is applied to the user's fingertip. In this state, the decrease of the kinetic friction force caused by the natural vibration of the top panel 120 does not occur.

Accordingly, the user can sense that the hand or the like is get caught in the window 501 only through the tactile sensation.

If the user recognizes that the hand or the like is get caught in the window 501, the user stops manipulating the electric window. Accordingly, at time t4, the drive current becomes zero.

According to the electronic device 100E of the fourth embodiment, the user can recognizes that the hand or the like is get caught in the window 501 only through the tactile sensation.

According to the fourth embodiment, it is possible to provide the fine or crispy tactile sensation (tactile sense) to the user and to make the user recognize that the hand or the like is get caught in the window 501 through the fine or crisp tactile sensation.

According to the embodiment as described above, the vibration of the top panel 120 is switched off when the drive current detected by the current sensor 520 becomes greater than or equal to the current Ic in a case where the hand or the like is get caught in the electric window.

However, an increase of a voltage or a temperature of the motor 510 may be detected by a sensor in order to determine whether the hand or the like is get caught in the electric window. The vibration of the top panel 120 may be switched off when the hand or the like is get caught in the electric window. In this case, a voltage sensor or a temperature sensor may be used instead of the current sensor 520.

Further, a sensor that detects a position, an acceleration, a load or a pressure may be used instead of the current sensor 520, and the vibration of the top panel 120 may be switched off when the position, the acceleration, the load or the pressure of a drive source increases greater than or equal to a designated value. The drive source is driven in response to the manipulation input performed onto the electronic device 100E.

Instead of the sensor as described above, a sensor which detects a light or a camera may be used. The position may be detected the sensor which detects the light or an image obtained by the camera. Accordingly, a sensor that monitors a state of the drive source which is driven in response to the manipulation input performed onto the electronic device 100E may be used instead of the current sensor 520, and the vibration of the top panel 120 may be switched off when a detected value increases greater than or equal to a designated value.

Accordingly, it becomes possible to provide the fine or crisp tactile sensation to the user and to make the user recognize that the state of the drive source is changed.

The fourth embodiment may be combined with the second embodiment or the third embodiment. In this case, the vibration of the top panel 120 is switched off upon completing the manipulation and the vibration of the top panel 120 is switched off when the detected value becomes greater than or equal to the designated value by monitoring the state as described above.

According to the embodiments as described above, it becomes possible to provide the drive control apparatus, the electronic device and the drive control method that can provide a fine or crisp tactile sensation to a user.

So far, the preferred embodiments and modification of the semiconductor circuit apparatus and electronic apparatus are described. However, the invention is not limited to those specifically described embodiments and the modification thereof, and various modifications and alteration may be made within the scope of the inventions described in the claims.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present invention has been described in detail, it should be understood that various changes, substitutions, and alterations could be made hereto without departing from the spirit and scope of the invention.

The present application is based on International Priority Application PCT/JP2013/076077 filed on Sep. 26, 2013, the entire contents of which are hereby incorporated by reference.

What is claimed is:

1. A drive control apparatus that drives a vibrating element of an electronic device including a top panel having a manipulation input surface, a position detector detecting a position of a manipulation input performed on the manipulation input surface and the vibrating element generating a vibration in the manipulation input surface, comprising:
    an amplitude modulator configured to modulate an amplitude of a wave signal in an ultrasound-frequency-band in accordance with amplitude data and to output the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and
    a drive controller configured to output the amplitude data used for modulating the amplitude of the wave signal to the amplitude modulator and to drive the vibrating element in response to the amplitude data, the drive controller being configured to control the amplitude data so as to switch the natural vibration between a strong level and a weak level in accordance with a travel distance of a position of a manipulation input performed onto the manipulation input surface.

2. The drive control apparatus as claimed in claim 1, wherein the drive signal causes the vibrating element to generate the natural vibration in the ultrasound-frequency-band in the manipulation input surface, the natural vibration having a constant frequency and a constant phase.

3. The drive control apparatus as claimed in claim 1, wherein the electronic device further includes a display part,
    wherein the position detector is disposed on a display surface side of the display part, and
    wherein the travel distance of the position of the manipulation input is a travel distance in a GUI input part displayed on the display part.

4. The drive control apparatus as claimed in claim 3, wherein the drive controller drives the vibrating element so as to switch the natural vibration between the strong level and the weak level when the travel distance of the position of the manipulation input reaches a unit travel distance of the GUI input part.

5. The drive control apparatus as claimed in claim 3, wherein the GUI input part is a dial type GUI input part or slidable GUI input part, and
    wherein the manipulation input is performed so as to manipulate a dial button or a slidable button.

6. The drive control apparatus as claimed in claim 1, wherein the position detector is disposed on an opposite side of the top panel with respect to the manipulation input surface, and
    wherein the travel distance of the position of the manipulation input is a travel distance of an operating portion provided on the top panel.

7. The drive control apparatus as claimed in claim 1, wherein the manipulation input surface has a rectangular shape having long sides and short sides in plan view, and
    wherein the drive controller causes the vibrating element to vibrate so that a standing wave of which amplitude varies along the long side occurs on the manipulation input surface.

8. The drive control apparatus as claimed in claim 1, wherein the drive controller drives the vibrating element intermittently so as to switch the natural vibration between the strong level and the weak level.

9. The drive control apparatus as claimed in claim 1, wherein the drive controller drives the vibrating element so as to switch the natural vibration between the strong level and the weak level in response to a first driving pattern before the travel distance reaches the designated travel distance, and
    wherein the drive controller drives the vibrating element so as to switch the natural vibration between the strong level and the weak level in response to a second driving pattern different from the first driving pattern after the travel distance reaches the designated travel distance.

10. The drive control apparatus as claimed in claim 9, wherein a switching degree of an intensity of the natural vibration according to the second driving pattern is smaller than a switching degree of the intensity of the natural vibration according to the first driving pattern.

11. The drive control apparatus as claimed in claim 10, wherein the switching degree of the intensity of the natural vibration according to the second driving pattern is zero, the intensity of the natural vibration according to the second driving pattern is zero, and the vibrating element is turned off.

12. The drive control apparatus as claimed in claim 9, wherein the designated travel distance is a first travel distance from a starting point of the manipulation input to a completing point of the manipulation input or a second travel distance from the starting point of the manipulation input to a finishing point at which the manipulation input of a designated degree of the first travel distance is finished.

13. The drive control apparatus as claimed in claim 9, wherein the first driving pattern varies a cycle for switching the intensity of the natural vibration or an amplitude of the natural vibration as the travel distance of the position of the manipulation input approaches a designated travel distance.

14. The drive control apparatus as claimed in claim 1, further comprising:
   a sensor configured to detect a drive current, a drive voltage, a temperature, a drive position, an acceleration, a load or a pressure of a drive source that is driven in response to the manipulation input performed to the electronic device used as an input device;
   wherein the drive controller drives the vibrating element so as to switch the intensity of the natural vibration in response to a first pattern when a detected value of the sensor is less than a designated value, and the drive controller drives the vibrating element so as to switch the intensity of the natural vibration in response to a second pattern different from the first pattern when the detected value becomes greater than or equal to the designated value.

15. The drive control apparatus as claimed in claim 1, wherein the vibrating element has a planar area smaller than that of the manipulation input surface.

16. An electronic device comprising:
   a top panel having a manipulation input surface;
   a position detector detecting a position of a manipulation input performed on the manipulation input surface;
   a vibrating element generating a vibration in the manipulation input surface;
   an amplitude modulator configured to modulate an amplitude of a wave signal in an ultrasound-frequency-band in accordance with amplitude data and to output the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and
   a drive controller configured to output the amplitude data used for modulating the amplitude of the wave signal to the amplitude modulator and to drive the vibrating element in response to the amplitude data, the drive controller being configured to control the amplitude data so as to switch the natural vibration between a strong level and a weak level in accordance with a travel distance of a position of a manipulation input performed onto the manipulation input surface.

17. The electronic device as claimed in claim 16, further comprising:
   an application controller configured to execute a designated process in response to the manipulation input while the drive controller drives the vibrating element intermittently so as to switch the natural vibration between the strong level and the weak level.

18. The electronic device as claimed in claim 16, further comprising:
   an application controller configured to execute a designated process in response to the manipulation input when the travel of the position of the manipulation input is completed.

19. The electronic device as claimed in claim 16, wherein the vibrating element has a planar area smaller than that of the manipulation input surface.

20. A drive controlling method for driving a vibrating element of an electronic device including a top panel having a manipulation input surface, a position detector detecting a position of a manipulation input performed on the manipulation input surface and the vibrating element generating a vibration in the manipulation input surface of the position detector, comprising:
   modulating, by the amplitude modulator, an amplitude of a wave signal in an ultrasound-frequency-band in accordance with amplitude data and outputting the modulated wave signal as a driving signal to the vibrating element, the driving signal being used for driving the vibrating element, the wave signal generating a natural vibration in the ultrasound-frequency-band in the manipulation input surface, the amplitude data representing an amplitude of the driving signal; and
   outputting, by a computer, the amplitude data used for modulating the amplitude of the wave signal to the amplitude modulator and driving the vibrating element in response to the amplitude data, the driving being configured to control the amplitude data so as to switch the natural vibration between a strong level and a weak level in accordance with a travel distance of a position of a manipulation input performed onto the manipulation input surface.

\* \* \* \* \*